United States Patent
Waltz et al.

(10) Patent No.: US 10,693,952 B2
(45) Date of Patent: Jun. 23, 2020

(54) TECHNOLOGIES FOR LOW LATENCY MESSAGING

(71) Applicant: salesforce.com, inc., San Francisco, CA (US)

(72) Inventors: D. Thomas Waltz, San Francisco, CA (US); Jerry Seiler, San Francisco, CA (US); Michael Clark, San Francisco, CA (US); Steve Shellist, San Francisco, CA (US); Kevin King, San Francisco, CA (US); Andrew Rewald, San Francisco, CA (US); Jonathan Bennett, San Francisco, CA (US); Mike Alexander, San Francisco, CA (US); Tod Karpinski, San Francisco, CA (US)

(73) Assignee: SALESFORCE.COM, INC., San Franscisco, CA (US)

(*) Notice: Subject to any disclaimer, the term of this patent is extended or adjusted under 35 U.S.C. 154(b) by 205 days.

(21) Appl. No.: 15/791,184

(22) Filed: Oct. 23, 2017

(65) Prior Publication Data

US 2019/0124141 A1   Apr. 25, 2019

(51) Int. Cl.
    *H04L 29/08* (2006.01)
    *G06F 16/27* (2019.01)

(52) U.S. Cl.
    CPC .......... *H04L 67/1008* (2013.01); *G06F 16/27* (2019.01); *H04L 67/10* (2013.01)

(58) Field of Classification Search
    None
    See application file for complete search history.

(56) References Cited

U.S. PATENT DOCUMENTS

| 5,577,188 | A | 11/1996 | Zhu |
| 5,608,872 | A | 3/1997 | Schwartz et al. |
| 5,649,104 | A | 7/1997 | Carleton et al. |

(Continued)

OTHER PUBLICATIONS

Fette, I., Melnikov, A., "The Websocket Protocol", Internet Engineering Task Force (IETF) Request for Comments 6455; ISSN: 2070-1721; Dec. 2011, pp. 1-71.

(Continued)

*Primary Examiner* — Scott B Christensen

(74) *Attorney, Agent, or Firm* — Schwabe Williamson & Wyatt

(57) ABSTRACT

Systems, methods, and computer-readable media for processing and sending messages with low latency are described. An application server may obtain a triggered send request (TSR) message from triggered send (TS) subscriber. The TSR message may comprise TSR information and a TSR payload. The application server may directly inject the TSR payload to an available message server for processing when the TSR information indicates that a first priority is associated with the payload, and may notify the available message server that the TSR payload is available for processing when the TSR information indicates that a second priority is associated with the payload. The application server may also write the TSR payload and/or TSR information to a TSS queue of a TSS tenant space, and may write the payload to a non-relational datastore regardless of a priority associated with the payload. Other embodiments may be described and/or claimed.

20 Claims, 10 Drawing Sheets

(56) References Cited

U.S. PATENT DOCUMENTS

| | | |
|---|---|---|
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 5,983,227 A | 11/1999 | Nazem et al. |
| 6,092,083 A | 7/2000 | Brodersen et al. |
| 6,161,149 A | 12/2000 | Achacoso et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,133 B1 | 4/2001 | Masthoff |
| 6,216,135 B1 | 4/2001 | Brodersen et al. |
| 6,233,617 B1 | 5/2001 | Rothwein et al. |
| 6,236,978 B1 | 5/2001 | Tuzhilin |
| 6,266,669 B1 | 7/2001 | Brodersen et al. |
| 6,288,717 B1 | 9/2001 | Dunkle |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,411,949 B1 | 6/2002 | Schaffer |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Dice et al. |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 6,907,566 B1 | 6/2005 | McElfresh et al. |
| 6,944,817 B1 | 9/2005 | Danneels |
| 7,062,502 B1 | 6/2006 | Kesler |
| 7,069,231 B1 | 6/2006 | Cinarkaya |
| 7,069,497 B1 | 6/2006 | Desai |
| 7,100,111 B2 | 8/2006 | McElfresh et al. |
| 7,117,246 B2 | 10/2006 | Christenson |
| 7,181,758 B1 | 2/2007 | Chan |
| 7,269,590 B2 | 9/2007 | Hull et al. |
| 7,289,976 B2 | 10/2007 | Kihneman et al. |
| 7,340,411 B2 | 3/2008 | Cook |
| 7,356,482 B2 | 4/2008 | Frankland et al. |
| 7,373,599 B2 | 5/2008 | McElfresh et al. |
| 7,401,094 B1 | 7/2008 | Kesler |
| 7,406,501 B2 | 7/2008 | Szeto et al. |
| 7,412,455 B2 | 8/2008 | Dillon |
| 7,454,509 B2 | 11/2008 | Boulter et al. |
| 7,508,789 B2 | 3/2009 | Chan |
| 7,599,935 B2 | 10/2009 | La Rotonda et al. |
| 7,603,331 B2 | 10/2009 | Tuzhilin et al. |
| 7,603,483 B2 | 10/2009 | Psounis et al. |
| 7,620,655 B2 | 11/2009 | Larsson et al. |
| 7,644,122 B2 | 1/2010 | Weyer et al. |
| 7,668,861 B2 | 2/2010 | Steven |
| 7,698,160 B2 | 4/2010 | Beaven et al. |
| 7,730,478 B2 | 6/2010 | Weissman |
| 7,747,648 B1 | 6/2010 | Kraft et al. |
| 7,779,039 B2 | 8/2010 | Weissman et al. |
| 7,779,475 B2 | 8/2010 | Jakobson et al. |
| 7,827,208 B2 | 11/2010 | Bosworth et al. |
| 7,853,881 B1 | 12/2010 | Aly Assal et al. |
| 7,945,653 B2 | 5/2011 | Zukerberg et al. |
| 8,005,896 B2 | 8/2011 | Cheah |
| 8,014,943 B2 | 9/2011 | Jakobson |
| 8,015,495 B2 | 9/2011 | Achacoso et al. |
| 8,032,297 B2 | 10/2011 | Jakobson |
| 8,037,140 B2 | 10/2011 | DelGaudio |
| 8,073,850 B1 | 12/2011 | Hubbard et al. |
| 8,082,301 B2 | 12/2011 | Ahlgren et al. |
| 8,095,413 B1 | 1/2012 | Beaven |
| 8,095,531 B2 | 1/2012 | Weissman et al. |
| 8,095,594 B2 | 1/2012 | Beaven et al. |
| 8,103,611 B2 | 1/2012 | Tuzhilin et al. |
| 8,150,913 B2 | 4/2012 | Cheah |
| 8,203,426 B1* | 6/2012 | Hirschfeld .......... G07C 9/00571 235/382 |
| 8,209,308 B2 | 6/2012 | Rueben et al. |
| 8,209,333 B2 | 6/2012 | Hubbard et al. |
| 8,275,836 B2 | 9/2012 | Beaven et al. |
| 8,280,913 B2 | 10/2012 | Bergin |
| 8,457,545 B2 | 6/2013 | Chan |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,045 B2 | 8/2013 | Rueben et al. |
| 8,510,664 B2 | 8/2013 | Rueben et al. |
| 8,566,301 B2 | 10/2013 | Rueben et al. |
| 8,646,103 B2 | 2/2014 | Jakobson et al. |
| 8,949,351 B2 | 2/2015 | Ciancio-Bunch |
| 9,613,085 B2 | 4/2017 | Ciancio-Bunch |
| 9,967,255 B2 | 5/2018 | Ciancio-Bunch |
| 2001/0044791 A1 | 11/2001 | Richter et al. |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2002/0198973 A1 | 12/2002 | Besaw |
| 2003/0004971 A1 | 1/2003 | Gong |
| 2003/0018705 A1 | 1/2003 | Chen et al. |
| 2003/0018830 A1 | 1/2003 | Chen et al. |
| 2003/0055757 A1 | 3/2003 | Pfiffner |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0115548 A1 | 6/2003 | Melgar |
| 2003/0117437 A1 | 6/2003 | Cook |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |

(56) References Cited

U.S. PATENT DOCUMENTS

| | | |
|---|---|---|
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0010470 A1 | 1/2005 | Marino |
| 2005/0050555 A1 | 3/2005 | Exley et al. |
| 2005/0091098 A1 | 4/2005 | Brodersen et al. |
| 2005/0198121 A1 | 9/2005 | Daniels |
| 2005/0228824 A1 | 10/2005 | Gattuso |
| 2005/0283461 A1 | 12/2005 | Sell |
| 2006/0075228 A1 | 4/2006 | Black |
| 2006/0174033 A1 | 8/2006 | Gillum |
| 2007/0073814 A1 | 3/2007 | Kamat |
| 2007/0192121 A1 | 8/2007 | Routson |
| 2007/0277099 A1 | 11/2007 | Nakayama |
| 2008/0249972 A1 | 10/2008 | Dillon |
| 2009/0006467 A1 | 1/2009 | Visscher |
| 2009/0013375 A1 | 1/2009 | MacIntosh |
| 2009/0063415 A1 | 3/2009 | Chatfield et al. |
| 2009/0082051 A1* | 3/2009 | Ruotsi .................... G06Q 10/10 455/519 |
| 2009/0100342 A1 | 4/2009 | Jakobson |
| 2009/0132868 A1 | 5/2009 | Chkodrov et al. |
| 2009/0144201 A1 | 6/2009 | Gierkink |
| 2009/0177744 A1 | 7/2009 | Marlow et al. |
| 2009/0319781 A1 | 12/2009 | Byrum |
| 2010/0299664 A1* | 11/2010 | Taylor ................. G06F 16/2379 717/173 |
| 2010/0305988 A1 | 12/2010 | Agarwal |
| 2011/0010548 A1 | 1/2011 | Stewart |
| 2011/0218958 A1 | 9/2011 | Warshavsky |
| 2011/0247051 A1 | 10/2011 | Bulumulla |
| 2011/0258178 A1* | 10/2011 | Eidson et al. .... G06F 17/30389 707/714 |
| 2011/0258179 A1* | 10/2011 | Weissman ......... G06F 16/24544 707/714 |
| 2011/0258628 A1* | 10/2011 | Devadhar ............... G06F 9/546 718/100 |
| 2011/0258630 A1* | 10/2011 | Fee ...................... G06F 9/4843 718/101 |
| 2012/0042218 A1 | 2/2012 | Cinarkaya |
| 2012/0059906 A1 | 3/2012 | Ciancio-Bunch |
| 2012/0110002 A1 | 5/2012 | Giambalvo |
| 2012/0233137 A1 | 9/2012 | Jakobson et al. |
| 2012/0290407 A1 | 11/2012 | Hubbard et al. |
| 2013/0151943 A1 | 6/2013 | Zhu |
| 2013/0212497 A1 | 8/2013 | Zelenko et al. |
| 2013/0218948 A1 | 8/2013 | Jakobson |
| 2013/0218949 A1 | 8/2013 | Jakobson |
| 2013/0218966 A1 | 8/2013 | Jakobson |
| 2013/0238718 A1 | 9/2013 | Santos |
| 2013/0247216 A1 | 9/2013 | Cinarkaya |
| 2014/0032484 A1 | 1/2014 | Cameron |
| 2014/0032683 A1 | 1/2014 | Maheshwari et al. |
| 2014/0074558 A1* | 3/2014 | Jain ................... G06Q 10/0637 705/7.36 |
| 2014/0108443 A1 | 4/2014 | Ciancio-Bunch |
| 2014/0359537 A1 | 12/2014 | Jackobson et al. |
| 2015/0074783 A1 | 3/2015 | Clothier et al. |
| 2015/0082387 A1 | 3/2015 | Ciancio-Bunch |
| 2015/0142844 A1 | 5/2015 | Bruce et al. |
| 2015/0207855 A1 | 7/2015 | Hanckel |
| 2016/0285623 A1 | 9/2016 | Yoon et al. |
| 2016/0299779 A1* | 10/2016 | Kulkarni ............. H04L 63/0492 |
| 2016/0350392 A1 | 12/2016 | Rice et al. |
| 2017/0006037 A1 | 1/2017 | Simone et al. |
| 2019/0028555 A1 | 1/2019 | Du |

OTHER PUBLICATIONS

MSGPACK Overview; https://github.com/msgpack/blog/master/spec.md#overview; Oct. 11, 2017, pp. 1-11.

SMPP Developers Forum, "Short Message Peer to Peer Protocol Specification v3.4", Issue 1.2, Oct. 12, 1999, pp. 1-169.

SMS Forum, "Short Message Peer to Peer Protocol Specification, Version 5.0," Feb. 19, 2003, pp. 1-166.

Yoshino, T., "Compression Extensions for WebSocket", Internet Engineering Task Force (IETF) Request for Comments 7692; ISSN: 2070-1721; Dec. 2015, pp. 1-28.

Salesforce, Soap API Developer Guide, Version 41.0, Winter 2018, Updated Oct. 5, 2017, pp. 2743-2751; entire document located: https://developer.salesforce.com/docs/atlas.en-us.api.meta/api/sforce_api_objects_document.htm#!.

International Search Report dated Oct. 11, 2013, in corresponding International Application No. PCT/US2013/035763.

International Searching Authority, International Search Report for PCT/US2010/026552, dated Apr. 23, 2010.

International Searching Authority, Written Opinion of the ISA for PCT/US2010/026552, dated Apr. 23, 2010.

Supplementary European Search Report dated May 9, 2014 in corresponding European Application No. 10749445.2.

\* cited by examiner

TECHNOLOGIES FOR LOW LATENCY MESSAGING

COPYRIGHT NOTICE

A portion of the disclosure of this patent document contains material which is subject to copyright protection. The copyright owner has no objection to the facsimile reproduction by anyone of the patent document or the patent disclosure, as it appears in the United States Patent and Trademark Office patent file or records, but otherwise reserves all copyright rights whatsoever.

TECHNICAL FIELD

One or more implementations relate generally to database systems, and in particular to systems and methods for processing and transmitting messages with low latency.

BACKGROUND

In multi-tenant database systems, customer organizations (also referred to as "tenants") may share database resources in one logical database. The databases themselves are typically shared, and each tenant is typically associated with an organization identifier (org ID) column or field that may be used to identify rows or records belonging to each tenant. Each tenant may provide their own custom data, which may include defining custom objects and custom fields, as well as designating one or more custom fields to act as custom index fields. Users of a multi-tenant database system (e.g., a tenant/organization (org) or developers associated with the tenant) may develop applications or platforms that interact or integrate with the multi-tenant database system and utilize data from an associated tenant space. The applications/platforms may obtain data from the associated tenant space to render/display visual representations of relevant tenant data. In some cases, the applications/platforms may utilize tenant data for interacting with clients by, for example, sending messages to various clients/customers of the tenant via the multi-tenant database system. To do so, the applications/platforms may include program code or script(s) that call an application programming interface (API) to create and execute the sending of these messages based on various triggering events.

Management and retention of these messages may become more complex as the tenants/orgs (and their applications/platforms) grow in size, scope, and complexity. With such growth comes the significant challenge of how to effectively and efficiently process and transmit the message to their intended recipients. Typically, requests for generating and sending messages are accumulated in a queue, and processed in a batch-wise and periodic basis. Such solutions may cause several seconds to several minutes of delay between the receipt of a request and the sending of a corresponding message. This delay will likely increase as the tenants/orgs applications/platforms grow in terms of numbers of customers, amount of customer data, and size/scope/complexity of their applications and platforms. It may be difficult for multi-tenant database system operators to quickly and effectively transmit these messages thereby resulting in increased resource overhead and/or user dissatisfaction.

BRIEF DESCRIPTION OF THE DRAWINGS

The included drawings are for illustrative purposes and serve to provide examples of possible structures and operations for the disclosed inventive systems, apparatus, methods and computer-readable storage media. These drawings in no way limit any changes in form and detail that may be made by one skilled in the art without departing from the spirit and scope of the disclosed implementations.

DETAILED DESCRIPTION

Figure 1A:
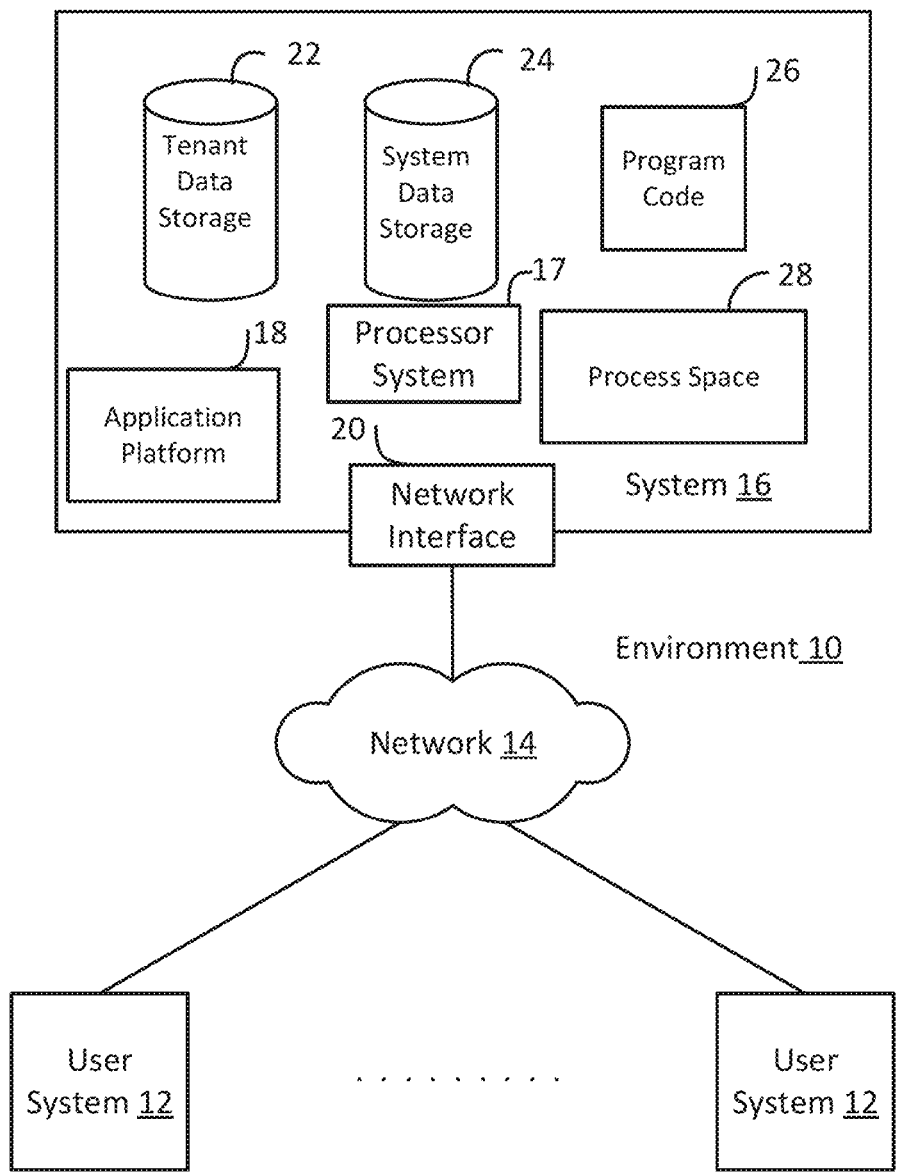
FIG. 1A shows a block diagram of an example environment in which an on-demand database service can be used according to some implementations.

Embodiments discussed herein provide mechanisms for generating and transmitting messages with low latency. In embodiments, an application (app) server may obtain a triggered send request (TSR) message from triggered send (TS) subscriber. The TSR message may comprise TSR information and a TSR payload. The app server may directly inject the TSR payload to an available message server for processing when the TSR information indicates that a first priority is associated with the payload. The app server may notify the available message server that the TSR payload is available for processing when the TSR information indicates that a second priority is associated with the payload. The app server may also write the TSR payload and/or TSR information to a TSS queue of a TSS tenant space, and may write the payload to a non-relational datastore regardless of a priority associated with the payload. Other embodiments may be described and/or claimed.

Examples of systems, apparatus, computer-readable storage media, and methods according to the disclosed implementations are described in this section. These examples are being provided solely to add context and aid in the understanding of the disclosed implementations. It will thus be apparent to one skilled in the art that the disclosed implementations may be practiced without some or all of the specific details provided. In other instances, certain process or method operations, also referred to herein as "blocks," have not been described in detail in order to avoid unnecessarily obscuring of the disclosed implementations. Other implementations and applications are also possible, and as such, the following examples should not be taken as definitive or limiting either in scope or setting.

In the following detailed description, references are made to the accompanying drawings, which form a part of the description and in which are shown, by way of illustration, specific implementations. Although these disclosed implementations are described in sufficient detail to enable one skilled in the art to practice the implementations, it is to be understood that these examples are not limiting, such that other implementations may be used and changes may be made to the disclosed implementations without departing from their spirit and scope. For example, the blocks of the methods shown and described herein are not necessarily performed in the order indicated in some other implementations. Additionally, in some other implementations, the disclosed methods may include more or fewer blocks than are described. As another example, some blocks described herein as separate blocks may be combined in some other implementations. Conversely, what may be described herein as a single block may be implemented in multiple blocks in some other implementations. Additionally, the conjunction "or" is intended herein in the inclusive sense where appropriate unless otherwise indicated; that is, the phrase "A, B or C" is intended to include the possibilities of "A," "B," "C," "A and B," "B and C," "A and C" and "A, B and C."

Some implementations described and referenced herein are directed to systems, apparatus, computer-implemented methods and computer-readable storage media for identifying articles helpful in resolving user queries.

As used herein, the term "tenant" may include a group of users who share common access with specific privileges to a software instance. A multi-tenant architecture, such as those discussed herein, may provide a tenant with a dedicated share of a software instance typically including one or more of tenant specific data, user management, tenant-specific functionality, configuration, customizations, non-functional properties, associated applications, etc. Multi-tenancy contrasts with multi-instance architectures, where separate software instances operate on behalf of different tenants. As used herein, the term an "instance" may refer to a concrete occurrence of an object, which may occur, for example, during execution of program code, and the terms "instantiate", "instantiation", and the like may refer to the creation of an instance.

In some implementations, the users described herein are users (or "members") of an interactive online "enterprise social network," also referred to herein as an "enterprise social networking system," an "enterprise collaborative network," or more simply as an "enterprise network." Such online enterprise networks are increasingly becoming a common way to facilitate communication among people, any of whom can be recognized as enterprise users. One example of an online enterprise social network is Chatter®, provided by salesforce.com, inc. of San Francisco, Calif. salesforce.com, inc. is a provider of enterprise social networking services, customer relationship management (CRM) services and other database management services, any of which can be accessed and used in conjunction with the techniques disclosed herein in some implementations. These various services can be provided in a cloud computing environment as described herein, for example, in the context of a multi-tenant database system. Some of the described techniques or processes can be implemented without having to install software locally, that is, on computing devices of users interacting with services available through the cloud.

While the disclosed implementations may be described with reference to Chatter® and more generally to enterprise social networking, those of ordinary skill in the art should understand that the disclosed techniques are neither limited to Chatter® nor to any other services and systems provided by salesforce.com, inc. and can be implemented in the context of various other database systems such as cloud-based systems that are not part of a multi-tenant database system or which do not provide enterprise social networking services.

Example System Overview

FIG. 1A shows a block diagram of an example of an environment 10 in which an on-demand database service can be used in accordance with some implementations. The environment 10 includes user systems 12, a network 14, a database system 16 (also referred to herein as a "cloud-based system"), a processor system 17, an application platform 18, a network interface 20, tenant database 22 for storing tenant data 23, system database 24 for storing system data 25, program code 26 for implementing various functions of the system 16, and process space 28 for executing database system processes and tenant-specific processes, such as running applications as part of an application hosting service. In some other implementations, environment 10 may not have all of these components or systems, or may have other components or systems instead of, or in addition to, those listed above.

In embodiments, the tenant data storage 22, the system data storage 24, and/or some other data store (not shown) may include Extract-Load-Transform (ELT) data or Extract-Transform-Load (ETL) data, which may be raw data extracted from various sources and normalized (e.g., indexed, partitioned, augmented, canonicalized, etc.) for analysis and other transformations. In some embodiments, the raw data may be loaded into the tenant data storage 22, the system data storage 24, and/or some other data store (not shown) and stored as key-value pairs, which may allow the data to be stored in a mostly native form without requiring substantial normalization or formatting.

In some implementations, the environment 10 is an environment in which an on-demand database service exists. An on-demand database service, such as that which can be implemented using the system 16, is a service that is made available to users outside of the enterprise(s) that own, maintain or provide access to the system 16. As described above, such users generally do not need to be concerned with building or maintaining the system 16. Instead, resources provided by the system 16 may be available for such users' use when the users need services provided by the system 16; that is, on the demand of the users. Some on-demand database services can store information from one or more tenants into tables of a common database image to form a multi-tenant database system (MTS). The term "multi-tenant database system" can refer to those systems in which various elements of hardware and software of a database system may be shared by one or more customers or tenants. For example, a given application server may simultaneously process requests for a great number of customers, and a given database table may store rows of data such as feed items for a potentially much greater number of customers. A database image can include one or more database objects. A relational database management system (RDBMS) or the equivalent can execute storage and retrieval of information against the database object(s).

Application platform 18 can be a framework that allows the applications of system 16 to execute, such as the hardware or software infrastructure of the system 16. In some implementations, the application platform 18 enables the creation, management and execution of one or more applications developed by the provider of the on-demand database service, users accessing the on-demand database service via user systems 12, or third party application developers accessing the on-demand database service via user systems 12.

In some implementations, the system 16 implements a web-based customer relationship management (CRM) system. For example, in some such implementations, the system 16 includes application servers configured to implement and execute CRM software applications as well as provide related data, code, forms, renderable web pages and documents and other information to and from user systems 12 and to store to, and retrieve from, a database system related data, objects, and Web page content. In some MTS implementations, data for multiple tenants may be stored in the same physical database object in tenant database 22. In some such implementations, tenant data is arranged in the storage medium(s) of tenant database 22 so that data of one tenant is kept logically separate from that of other tenants so that one tenant does not have access to another tenant's data, unless such data is expressly shared. The system 16 also implements applications other than, or in addition to, a CRM application. For example, the system 16 can provide tenant access to multiple hosted (standard and custom) applications, including a CRM application. User (or third party developer) applications, which may or may not include CRM, may be supported by the application platform 18. The application platform 18 manages the creation and storage of the applications into one or more database objects and the execution of the applications in one or more virtual machines in the process space of the system 16. The applications of the application platform 18 may be developed with server-side programming languages, such as PHP, Java and/or Java Server Pages (JSP), Node.js, ASP.NET, and/or any other like technology that renders HTML. The applications may be built using a platform-specific and/or proprietary development tool and/or programming languages, such as Salesforce® Apex and/or the like.

According to some implementations, each system 16 is configured to provide web pages, forms, applications, data and media content to user (client) systems 12 to support the access by user systems 12 as tenants of system 16. As such, system 16 provides security mechanisms to keep each tenant's data separate unless the data is shared. If more than one MTS is used, they may be located in close proximity to one another (for example, in a server farm located in a single building or campus), or they may be distributed at locations remote from one another (for example, one or more servers located in city A and one or more servers located in city B). As used herein, each MTS could include one or more logically or physically connected servers distributed locally or across one or more geographic locations. Additionally, the term "server" is meant to refer to a computing device or system, including processing hardware and process space(s), an associated storage medium such as a memory device or database, and, in some instances, a database application (for example, OODBMS or RDBMS) as is well known in the art. It should also be understood that "server system" and "server" are often used interchangeably herein. Similarly, the database objects described herein can be implemented as part of a single database, a distributed database, a collection of distributed databases, a database with redundant online or offline backups or other redundancies, etc., and can include a distributed database or storage network and associated processing intelligence.

The network 14 can be or include any network or combination of networks of systems or devices that communicate with one another. For example, the network 14 can be or include any one or any combination of a local area network (LAN), wide area network (WAN), telephone network, wireless network, cellular network, point-to-point network, star network, token ring network, hub network, or other appropriate configuration. The network 14 can include a Transfer Control Protocol and Internet Protocol (TCP/IP) network, such as the global internetwork of networks often referred to as the "Internet" (with a capital "I"). The Internet will be used in many of the examples herein. However, it should be understood that the networks that the disclosed implementations can use are not so limited, although TCP/IP is a frequently implemented protocol.

The user systems 12 can communicate with system 16 using TCP/IP and, at a higher network level, other common Internet protocols to communicate, such as Hypertext Transfer Protocol (HTTP), File Transfer Protocol (FTP), Andrew File System (AFS), Wireless Application Protocol (WAP), Session Initiation Protocol (SIP) with Real-Time Transport Protocol (RTP or Secure RTP (SRTP), WebSocket protocol, etc. In an example where HTTP is used, each user system 12 can include an HTTP client commonly referred to as a "web browser" or simply a "browser" for sending and receiving HTTP signals to and from an HTTP server (also referred to as a "web server") of the system 16. In this example, each user system 12 may send and receive HTTP messages where a header of each message includes various operating parameters and the body of the such messages may include hypertext markup language (HTML), extensible markup language (XML), JavaScript Object Notation (JSON), etc. Such an HTTP server can be implemented as the sole network interface 20 between the system 16 and the network 14, but other techniques can be used in addition to or instead of these techniques. In some implementations, the network interface 20 between the system 16 and the network 14 includes load sharing functionality, such as round-robin HTTP request distributors to balance loads and distribute incoming HTTP requests evenly over a number of servers. In MTS implementations, each of the servers can have access to the MTS data; however, other alternative configurations may be used instead.

The user systems 12 can be implemented as any computing device(s) or other data processing apparatus or systems usable by users to access the database system 16. For example, any of user systems 12 can be a desktop computer, a work station, a laptop computer, a tablet computer, a handheld computing device, a mobile cellular phone (for example, a "smartphone"), or any other Wi-Fi-enabled device, WAP-enabled device, or other computing device capable of interfacing directly or indirectly to the Internet or other network. The terms "user system" and "computing device" are used interchangeably herein with one another and with the term "computer."

As described above, each user system 12 typically executes an HTTP client, for example, a web browsing (or simply "browsing") program, such as a web browser based on the WebKit platform, Microsoft's Internet Explorer browser, Apple's Safari, Google's Chrome, Opera's browser, or Mozilla's Firefox browser, and/or the like, to execute and render web applications allowing a user (for example, a subscriber of on-demand services provided by the system 16) of the user system 12 to access, process and view information, pages, interfaces, and applications available to it from the system 16 over the network 14. In other implementations, each user system 12 may operate a user (or third party) application designed to interact with applications of the application platform 18 allowing a user (for example, a subscriber of on-demand services provided by the system 16) of the user system 12 to access, process and view information, pages and applications available to it from the system 16 over the network 14. The user application may be platform-specific, such as when the user system 12 is implemented in a mobile device, such as a smartphone, tablet computer, and the like. This application may be a native application (e.g., executed and rendered in an application container or skeleton) or a hybrid application (e.g., web applications being executed/rendered in an application container/skeleton).

The (web or third party) applications may be built using website development tools and/or programming languages, such as HTML, Cascading Stylesheets (CSS), JavaScript, JQuery, and the like; and/or using platform-specific development tools and/or programming languages (e.g., Salesforce® Apex, Salesforce® Visualforce®, Salesforce® Lightning®, Salesforce® Wave™ Dashboard Designer, Salesforce@® Force.com® IDE, Android® Studio™ integrated development environment (IDE), Apple® iOS® software development kit (SDK), etc.). The term "platform-specific" may refer to the platform implemented by the user system 12 and/or the platform implemented by the database system 16. Furthermore, such applications may utilize a suitable querying language to query and store information in an associated tenant space, such as Structure Query Language (SQL), object query language (OQL), Salesforce® OQL (SOQL), Salesforce® object search language (SOSL), Salesforce® analytics query language (SAQL), and/or other like query languages.

Regardless of whether this application is a native application, web application, or hybrid application, the user systems 12 may implement such applications to request and obtain data from database system 16, and render graphical user interfaces (GUIs) in an container or browser. In various embodiments, the GUIs may include a data analytics GUI, such as Salesforce® Wave™ dashboard, which may provide visual representations of data residing in an enterprise cloud or in an on-demand services environment (e.g., a tenant space within database system 16). In embodiments, the GUI may include one or more graphical control elements (GCEs) or widgets, which may enable a user of a user system 12 to select visualization parameters (also referred to as "lens parameters" or "filters") for displaying data from one or more datasets. A dataset may be a specific view or transformation of data from one or more data sources (e.g., a tenant space of database 22, etc.). The visualization parameters may include, for example, a selection of data or data type to display from one or more datasets; a particular graph, chart, or map in which to view the selected data; color schemes for the graphs/charts/maps; a position or orientation of the graphs/charts/maps within the GUI, etc. The graphs/charts/maps to be displayed may be referred to as a "lens" or a "dashboard". A lens may be a particular view of data from one or more datasets, and a dashboard may be a collection of lenses. In embodiments, the GUI may display lenses, dashboards, and/or control panels to alter or rearrange the lenses/dashboards.

Each user system 12 typically includes an operating system (OS) to manage computer hardware and software resources, and provide common services for various applications. The OS may include one or more drivers and/or APIs that provide an interface to hardware devices thereby enabling the OS and applications to access hardware functions. In some embodiments, the OS may include middleware that may connect two or more separate applications or connect applications with underlying hardware components beyond those available from OS and/or the drivers/APIs. The OS may be a general purpose operating system or an operating system specifically written for and tailored to the user system 12.

Each user system 12 also typically includes one or more user input devices, such as a keyboard, a mouse, a trackball, a touch pad, a touch screen, a pen or stylus or the like, for interacting with a GUI provided by the browser on a display (for example, a monitor screen, liquid crystal display (LCD), light-emitting diode (LED) display, among other possibilities) of the user system 12 in conjunction with pages, forms, applications and other information provided by the system 16 or other systems or servers. For example, the user interface device can be used to access data and applications hosted by system 16, and to perform searches on stored data, and otherwise allow a user to interact with various GUI pages that may be presented to a user. As discussed above, implementations are suitable for use with the Internet, although other networks can be used instead of or in addition to the Internet, such as an intranet, an extranet, a virtual private network (VPN), a non-TCP/IP based network, any LAN or WAN or the like.

The users of user systems 12 may differ in their respective capacities, and the capacity of a particular user system 12 can be entirely determined by permissions (permission levels) for the current user of such user system. For example, where a salesperson is using a particular user system 12 to interact with the system 16, that user system can have the capacities allotted to the salesperson. However, while an administrator is using that user system 12 to interact with the system 16, that user system can have the capacities allotted to that administrator. Where a hierarchical role model is used, users at one permission level can have access to applications, data, and database information accessible by a lower permission level user, but may not have access to certain applications, database information, and data accessible by a user at a higher permission level. Thus, different users generally will have different capabilities with regard to accessing and modifying application and database information, depending on the users' respective security or permission levels (also referred to as "authorizations").

According to some implementations, each user system 12 and some or all of its components are operator-configurable using applications, such as a browser, including computer code executed using one or more central processing units (CPUs) and/or other like computer processing devices, such as Intel Pentium® or Core® processor(s); Advanced Micro Devices (AMD) Ryzen® processor(s) or Accelerated Processing Units (APUs); or the like. Similarly, the system 16 (and additional instances of an MTS, where more than one is present) and all of its components can be operator-configurable using application(s) including computer code to run using the processor system 17, which may include one or more CPUs/processors, which may include one or multiple Intel Pentium® or Xeon® processors, one or more AMD Epyc® processors, or the like.

The system 16 includes tangible computer-readable media having non-transitory instructions stored thereon/in that are executable by or used to program a server (e.g., the app servers 100 and OMM entities 300/message servers discussed herein) or other computing system (or collection of such servers or computing systems) to perform some of the implementation of processes described herein. For example, computer program code 26 can implement instructions for operating and configuring the system 16 to intercommunicate and to process web pages, applications and other data and media content as described herein. In some implementations, the computer code 26 can be downloadable and stored on a hard disk, but the entire program code, or portions thereof, also can be stored in any other volatile or non-volatile memory medium or device as is well known, such as a ROM or RAM, or provided on any media capable of storing program code, such as any type of rotating media including floppy disks, optical discs, digital versatile disks (DVD), compact disks (CD), microdrives, and magneto-optical disks, and magnetic or optical cards, nanosystems (including molecular memory ICs), or any other type of computer-readable medium or device suitable for storing instructions or data. Additionally, the entire program code, or portions thereof, may be transmitted and downloaded from a software source over a transmission medium, for example, over the Internet, or from another server, as is well known, or transmitted over any other existing network connection as is well known (for example, extranet, VPN, LAN, etc.) using any communication medium and protocols (for example, TCP/IP, HTTP, HTTPS, Ethernet, etc.) as are well known. It will also be appreciated that computer code for the disclosed implementations can be realized in any programming language that can be executed on a server or other computing system such as, for example, C, C++, HTML, any other markup language, Java™, JavaScript, ActiveX, any other scripting language, such as VBScript, and many other programming languages as are well known may be used. (Java™ is a trademark of Sun Microsystems. Inc.).

Figure 1B:
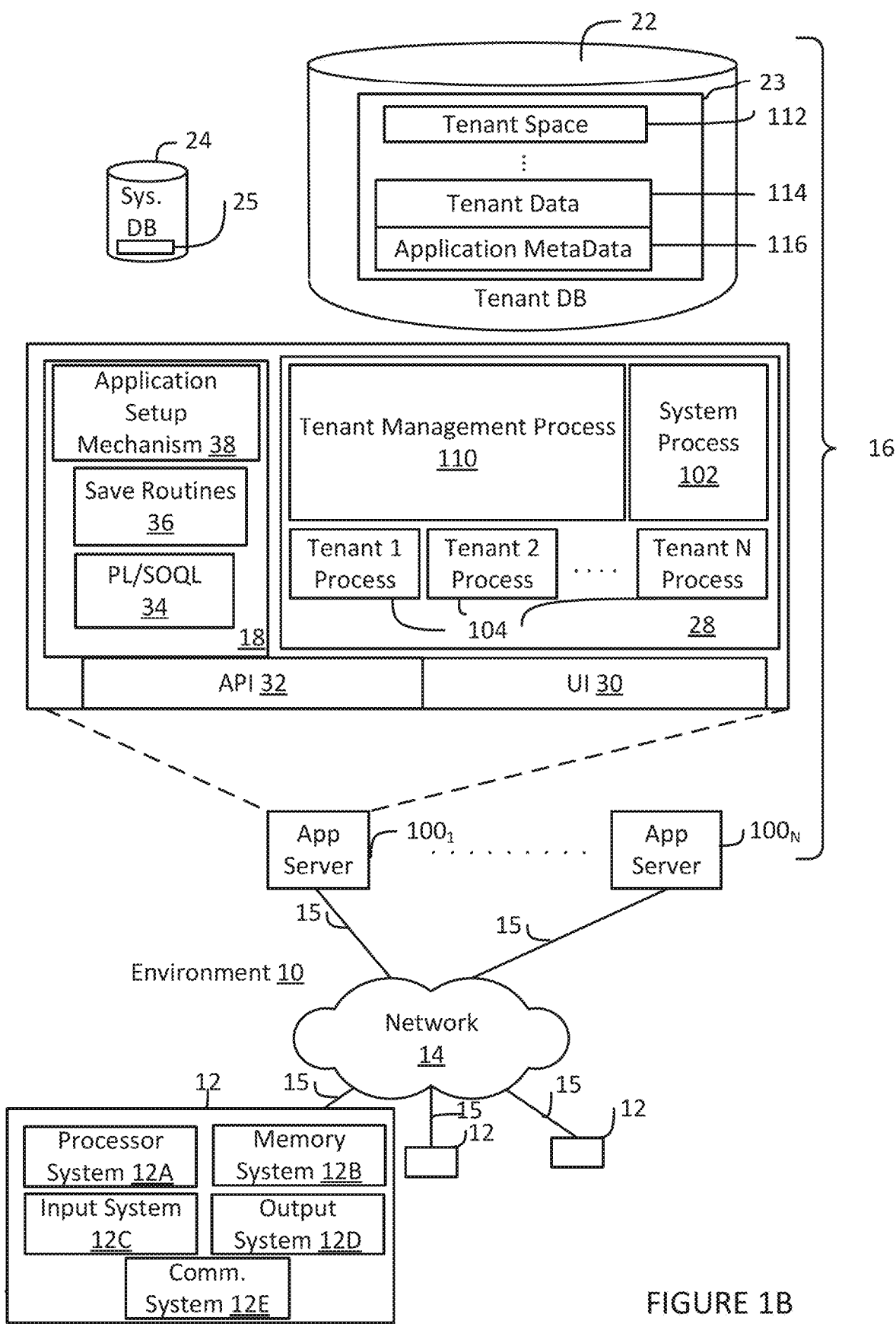
FIG. 1B shows a block diagram of example implementations of elements of FIG. 1A and example interconnections between these elements according to some implementations.

FIG. 1B shows a block diagram of example implementations of elements of FIG. 1A and example interconnections between these elements according to some implementations. That is, FIG. 1B also illustrates environment 10, but FIG. 1B, various elements of the system 16 and various interconnections between such elements are shown with more specificity according to some more specific implementations. Additionally, in FIG. 1B, the user system 12 includes a processor system 12A, a memory system 12B, an input system 12C, an output system 12D, and a communications system 12E. The processor system 12A can include any suitable combination of one or more processors, such as one or more central processing units (CPUs) including single-core or multi-core processors (such as those discussed herein), one or more graphics processing units (GPUs), one or more field-programmable gate arrays (FPGAs), or any other electronic circuitry capable of executing program code and/or software modules to perform arithmetic, logical, and/or input/output operations. The memory system 12B can include any suitable combination of one or more memory devices, such as volatile storage devices (e.g., random access memory (RAM), dynamic RAM (DRAM), etc.) and non-volatile memory device (e.g., read only memory (ROM), flash memory, etc.). The input system 12C can include any suitable combination of input devices, such as one or more touchscreen interfaces, keyboards, mice, trackballs, scanners, cameras, or interfaces to networks. The output system 12D can include any suitable combination of output devices, such as one or more display devices, printers, or interfaces to networks.

The communications system 12E may include circuitry for communicating with a wireless network or wired network. Communications system 12E may be used to establish a link 15 (also referred to as "channel 15," 'networking layer tunnel 15," and the like) through which the user system 12 may communicate with the database system 16. Communications system 12E may include one or more processors (e.g., baseband processors, etc.) that are dedicated to a particular wireless communication protocol (e.g., Wi-Fi and/or IEEE 802.11 protocols), a cellular communication protocol (e.g., Long Term Evolution (LTE) and the like), a wireless personal area network (WPAN) protocol (e.g., IEEE 802.15.4-802.15.5 protocols, Bluetooth or Bluetooth low energy (BLE), etc.), and/or a wired communication protocol (e.g., Ethernet, Fiber Distributed Data Interface (FDDI), Point-to-Point (PPP), etc.). The communications system 12E may also include hardware devices that enable communication with wireless/wired networks and/or other user systems 12 using modulated electromagnetic radiation through a solid or non-solid medium. Such hardware devices may include switches, filters, amplifiers, antenna elements, and the like to facilitate the communications over the air or through a wire by generating or otherwise producing radio waves to transmit data to one or more other devices, and converting received signals into usable information, such as digital data, which may be provided to one or more other components of user system 12. To communicate (e.g., transmit/receive) with the database system 16, the user system 12 using the communications system 12E may establish link 15 with network interface 20 of the database system 16.

In FIG. 1B, the network interface 20 is implemented as a set of HTTP application servers $100_1$-$100_N$. Each application server 100 (also referred to herein as an "app server", an "application programming interface (API) server", a "worker node", and/or the like) is configured to communicate with tenant database 22 and the tenant data 23 therein, as well as system database 24 and the system data 25 therein, to serve requests received from the user systems 12. The tenant data 23 can be divided into individual tenant storage spaces 112, which can be physically or logically arranged or divided. Within each tenant storage space 112, user storage 114 and application metadata 116 can similarly be allocated for each user. For example, a copy of a user's most recently used (MRU) items can be stored to user storage 114. Similarly, a copy of MRU items for an entire organization that is a tenant can be stored to tenant storage space 112.

The process space 28 includes system process space 102, individual tenant process spaces 104 and a tenant management process space 110. The application platform 18 includes an application setup mechanism 38 that supports application developers' creation and management of applications. Such applications and others can be saved as metadata into tenant database 22 by save routines 36 for execution by subscribers as one or more tenant process spaces 104 managed by tenant management process 110, for example. Invocations to such applications can be coded using PL/SOQL 34, which provides a programming language style interface extension to API 32. A detailed description of some PL/SOQL language implementations is discussed in commonly assigned U.S. Pat. No. 7,730,478, titled METHOD AND SYSTEM FOR ALLOWING ACCESS TO DEVELOPED APPLICATIONS VIA A MULTI-TENANT ON-DEMAND DATABASE SERVICE, by Craig Weissman, issued on Jun. 1, 2010, and hereby incorporated by reference in its entirety and for all purposes. Invocations to applications can be detected by one or more system processes, which manage retrieving application metadata 116 for the subscriber making the invocation and executing the metadata as an application in a virtual machine.

The system 16 of FIG. 1B also includes a user interface (UI) 30 and an API 32 to system 16 resident processes to users or developers at user systems 12. In some other implementations, the environment 10 may not have the same elements as those listed above or may have other elements instead of, or in addition to, those listed above.

Each application server 100 can be communicably coupled with tenant database 22 and system database 24, for example, having access to tenant data 23 and system data 25, respectively, via a different network connection 15. For example, one application server $100_1$ can be coupled via the network 14 (for example, the Internet), another application server $100_{N-1}$ can be coupled via a direct network link 15, and another application server $100_N$ can be coupled by yet a different network connection 15. Transfer Control Protocol and Internet Protocol (TCP/IP) are examples of typical protocols that can be used for communicating between application servers 100 and the system 16. However, it will be apparent to one skilled in the art that other transport protocols can be used to optimize the system 16 depending on the network interconnections used.

In some implementations, each application server 100 is configured to handle requests for any user associated with any organization that is a tenant of the system 16. In this regard, each application server 100 may be configured to perform various database functions (e.g., indexing, querying, etc.) as well as formatting obtained data (e.g., ELT data, ETL data, etc.) for various user interfaces to be rendered by the user systems 12. Because it can be desirable to be able to add and remove application servers 100 from the server pool at any time and for various reasons, in some implementations there is no server affinity for a user or organization to a specific application server 100. In some such implementations, an interface system implementing a load balancing function (for example, an F5 Big-IP load balancer) is communicably coupled between the application servers 100 and the user systems 12 to distribute requests to the application servers 100. In one implementation, the load balancer uses a least-connections algorithm to route user requests to the application servers 100. Other examples of load balancing algorithms, such as round robin and observed-response-time, also can be used. For example, in some instances, three consecutive requests from the same user could hit three different application servers 100, and three requests from different users could hit the same application server 100. In this manner, by way of example, system 16 can be a multi-tenant system in which system 16 handles storage of, and access to, different objects, data and applications across disparate users and organizations.

In one example storage use case, one tenant can be a company that employs a sales force where each salesperson uses system 16 to manage aspects of their sales. A user can maintain contact data, leads data, customer follow-up data, performance data, goals and progress data, etc., all applicable to that user's personal sales process (for example, in tenant database 22). In an example of a MTS arrangement, because all of the data and the applications to access, view, modify, report, transmit, calculate, etc., can be maintained and accessed by a user system 12 having little more than network access, the user can manage his or her sales efforts and cycles from any of many different user systems. For example, when a salesperson is visiting a customer and the customer has Internet access in their lobby, the salesperson can obtain critical updates regarding that customer while waiting for the customer to arrive in the lobby.

While each user's data can be stored separately from other users' data regardless of the employers of each user, some data can be organization-wide data shared or accessible by several users or all of the users for a given organization that is a tenant. Thus, there can be some data structures managed by system 16 that are allocated at the tenant level while other data structures can be managed at the user level. Because an MTS can support multiple tenants including possible competitors, the MTS can have security protocols that keep data, applications, and application use separate. Also, because many tenants may opt for access to an MTS rather than maintain their own system, redundancy, up-time, and backup are additional functions that can be implemented in the MTS. In addition to user-specific data and tenant-specific data, the system 16 also can maintain system level data usable by multiple tenants or other data. Such system level data can include industry reports, news, postings, and the like that are sharable among tenants.

In some implementations, the user systems 12 (which also can be client systems) communicate with the application servers 100 to request and update system-level and tenant-level data from the system 16. Such requests and updates can involve sending one or more queries to tenant database 22 or system database 24. The system 16 (for example, an application server 100 in the system 16) can automatically generate one or more SQL statements (for example, one or more SQL queries) designed to access the desired information. System database 24 can generate query plans to access the requested data from the database. The term "query plan" generally refers to one or more operations used to access information in a database system.

Each database can generally be viewed as a collection of objects, such as a set of logical tables, containing data fitted into predefined or customizable categories. As used herein, a "database object", "data object", or the like may refer to any representation of information in a database that is in the form of an object or tuple, and may include variables, data structures, functions, methods, classes, database records, database fields, database entities, associations between data and database entities (also referred to as a "relation"), and the like. A "table" is one representation of a data object, and may be used herein to simplify the conceptual description of objects and custom objects according to some implementations. It should be understood that "table" and "data(base) object" may be used interchangeably herein. Each table generally contains one or more data categories logically arranged as columns or fields in a viewable schema. Each row or element of a table can contain an instance of data for each category defined by the fields. For example, a CRM database can include a table that describes a customer with fields for basic contact information such as name, address, phone number, fax number, etc. Another table can describe a purchase order, including fields for information such as customer, product, sale price, date, etc. In some MTS implementations, standard entity tables can be provided for use by all tenants. For CRM database applications, such standard entities can include tables for case, account, contact, lead, and opportunity data objects, each containing pre-defined fields. As used herein, the term "entity" also may be used interchangeably with "object" and "table."

In some MTS implementations, tenants are allowed to create and store custom objects, or may be allowed to customize standard entities or objects, for example by creating custom fields for standard objects, including custom index fields. Commonly assigned U.S. Pat. No. 7,779,039, titled CUSTOM ENTITIES AND FIELDS IN A MULTI-TENANT DATABASE SYSTEM, by Weissman et al., issued on Aug. 17, 2010, and hereby incorporated by reference in its entirety and for all purposes, teaches systems and methods for creating custom objects as well as customizing standard objects in a multi-tenant database system. In some implementations, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

Figure 2A:
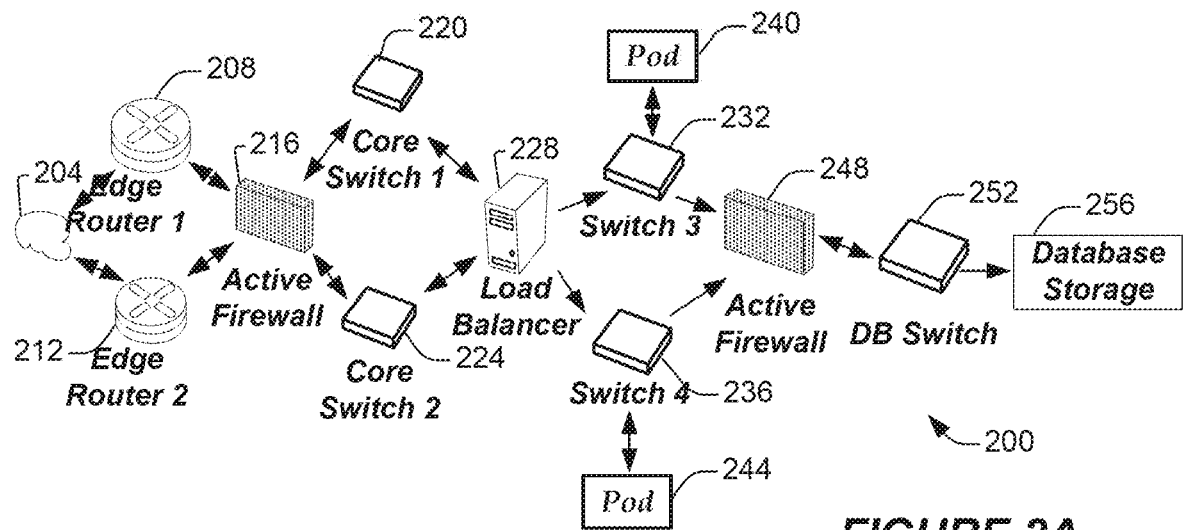
FIG. 2A shows a system diagram of example architectural components of an on-demand database service environment according to some implementations.

FIG. 2A shows a system diagram illustrating example architectural components of an on-demand database service environment 200 according to some implementations. A client machine communicably connected with the cloud 204, generally referring to one or more networks in combination, as described herein, can communicate with the on-demand database service environment 200 via one or more edge routers 208 and 212. A client machine can be any of the examples of user systems 12 described above. The edge routers can communicate with one or more core switches 220 and 224 through a firewall 216. The core switches can communicate with a load balancer 228, which can distribute server load over different pods, such as the pods 240 and 244. The pods 240 and 244, which can each include one or more servers or other computing resources, can perform data processing and other operations used to provide on-demand services. As used herein, the term "computing resource", "hardware resource", etc., may refer to a physical or virtual device, a physical or virtual component within a computing environment, and/or physical or virtual component within a particular device, such as computer devices, mechanical devices, memory space, processor/CPU time and/or processor/CPU usage, hardware time or usage, electrical power, input/output operations, ports or network sockets, channel/link allocation, throughput, and/or the like. As used herein, the term "network resource" may refer to computing resources that are accessible by computer devices via a communications network. Communication with the pods can be conducted via pod switches 232 and 236. Components of the on-demand database service environment can communicate with database storage 256 through a database firewall 248 and a database switch 252.

Figure 2B:
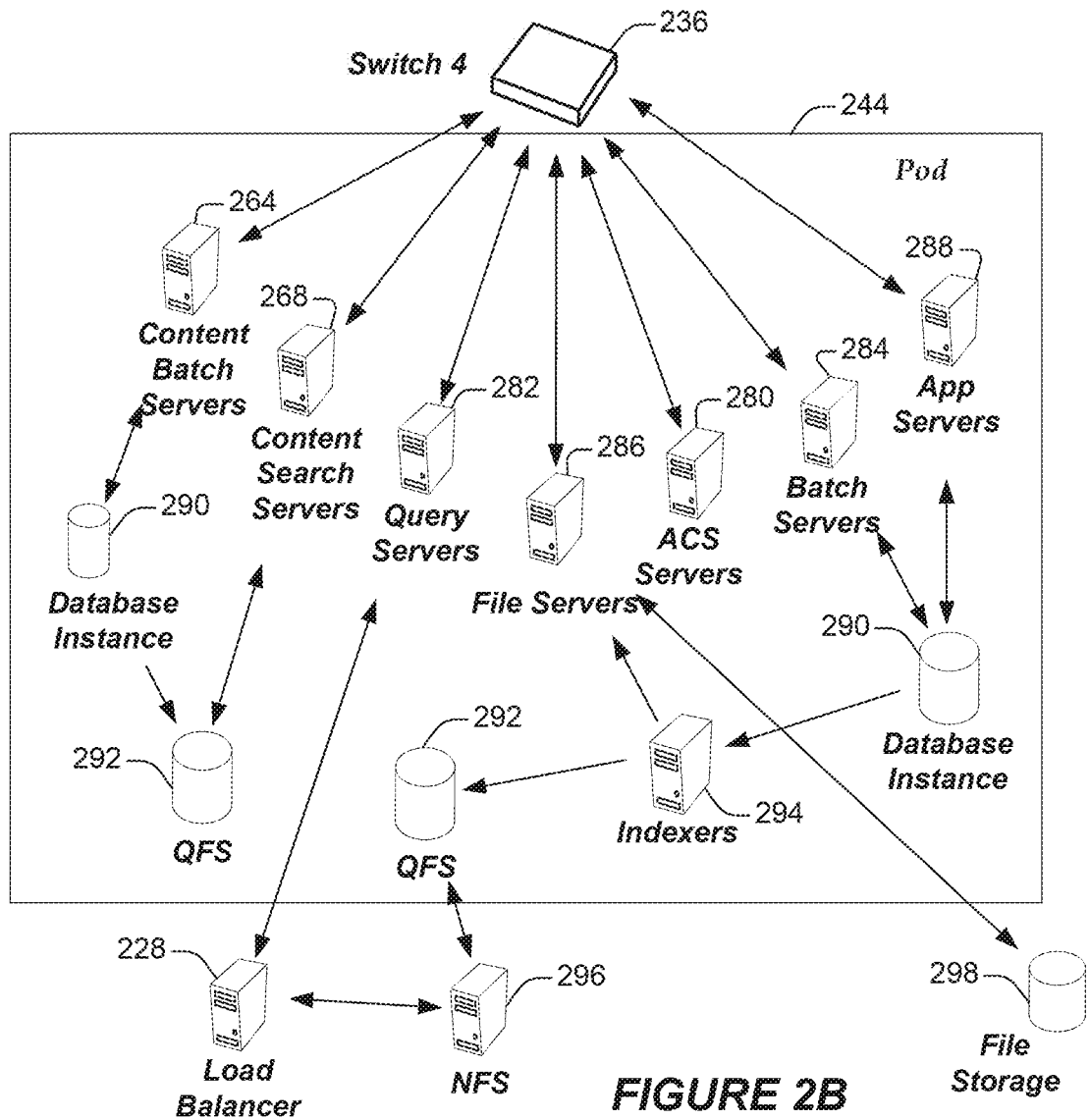
FIG. 2B shows a system diagram further illustrating example architectural components of an on-demand database service environment according to some implementations.

As shown in FIGS. 2A and 2B, accessing an on-demand database service environment can involve communications transmitted among a variety of different hardware or software components. Further, the on-demand database service environment 200 is a simplified representation of an actual on-demand database service environment. For example, while only one or two devices of each type are shown in FIGS. 2A and 2B, some implementations of an on-demand database service environment can include anywhere from one to several devices of each type. Also, the on-demand database service environment need not include each device shown in FIGS. 2A and 2B, or can include additional devices not shown in FIGS. 2A and 2B.

Additionally, it should be appreciated that one or more of the devices in the on-demand database service environment 200 can be implemented on the same physical device or on different hardware. Some devices can be implemented using hardware or a combination of hardware and software. Thus, terms such as "data processing apparatus," "machine," "server" and "device" as used herein are not limited to a single hardware device, rather references to these terms can include any suitable combination of hardware and software configured to provide the described functionality.

The cloud 204 is intended to refer to a data network or multiple data networks, often including the Internet. Client machines communicably connected with the cloud 204 can communicate with other components of the on-demand database service environment 200 to access services provided by the on-demand database service environment. For example, client machines can access the on-demand database service environment to retrieve, store, edit, or process information. In some implementations, the edge routers 208 and 212 route packets between the cloud 204 and other components of the on-demand database service environment 200. For example, the edge routers 208 and 212 can employ the Border Gateway Protocol (BGP). The BGP is the core routing protocol of the Internet. The edge routers 208 and 212 can maintain a table of IP networks or 'prefixes', which designate network reachability among autonomous systems on the Internet.

In some implementations, the firewall 216 can protect the inner components of the on-demand database service environment 200 from Internet traffic. The firewall 216 can block, permit, or deny access to the inner components of the on-demand database service environment 200 based upon a set of rules and other criteria. The firewall 216 can act as one or more of a packet filter, an application gateway, a stateful filter, a proxy server, or any other type of firewall.

In some implementations, the core switches 220 and 224 are high-capacity switches that transfer packets within the on-demand database service environment 200. The core switches 220 and 224 can be configured as network bridges that quickly route data between different components within the on-demand database service environment. In some implementations, the use of two or more core switches 220 and 224 can provide redundancy or reduced latency.

In some implementations, the pods 240 and 244 perform the core data processing and service functions provided by the on-demand database service environment. Each pod can include various types of hardware or software computing resources. An example of the pod architecture is discussed in greater detail with reference to FIG. 2B. In some implementations, communication between the pods 240 and 244 is conducted via the pod switches 232 and 236. The pod switches 232 and 236 can facilitate communication between the pods 240 and 244 and client machines communicably connected with the cloud 204, for example via core switches 220 and 224. Also, the pod switches 232 and 236 may facilitate communication between the pods 240 and 244 and the database storage 256. In some implementations, the load balancer 228 can distribute workload between the pods 240 and 244. Balancing the on-demand service requests between the pods can assist in improving the use of resources, increasing throughput, reducing response times, or reducing overhead. The load balancer 228 may include multilayer switches to analyze and forward traffic.

In some implementations, access to the database storage 256 is guarded by a database firewall 248. The database firewall 248 can act as a computer application firewall operating at the database application layer of a protocol stack. The database firewall 248 can protect the database storage 256 from application attacks such as structure query language (SQL) injection, database rootkits, and unauthorized information disclosure. In some implementations, the database firewall 248 includes a host using one or more forms of reverse proxy services to proxy traffic before passing it to a gateway router. The database firewall 248 can inspect the contents of database traffic and block certain content or database requests. The database firewall 248 can work on the SQL application level atop the TCP/IP stack, managing applications' connection to the database or SQL management interfaces as well as intercepting and enforcing packets traveling to or from a database network or application interface.

In some implementations, communication with the database storage 256 is conducted via the database switch 252. The multi-tenant database storage 256 can include more than one hardware or software components for handling database queries. Accordingly, the database switch 252 can direct database queries transmitted by other components of the on-demand database service environment (for example, the pods 240 and 244) to the correct components within the database storage 256. In some implementations, the database storage 256 is an on-demand database system shared by many different organizations as described above with reference to FIGS. 1A and 1B.

FIG. 2B shows a system diagram further illustrating example architectural components of an on-demand database service environment according to some implementations. The pod 244 can be used to render services to a user of the on-demand database service environment 200. In some implementations, each pod includes a variety of servers or other systems. The pod 244 includes one or more content batch servers 264, content search servers 268, query servers 282, file force servers 286, access control system (ACS) servers 280, batch servers 284, and app servers 288. The pod 244 also can include database instances 290, quick file systems (QFS) 292, and indexers 294. In some implementations, some or all communication between the servers in the pod 244 can be transmitted via the switch 236.

In some implementations, the app servers 288 include a hardware or software framework dedicated to the execution of procedures (for example, programs, routines, scripts) for supporting the construction of applications provided by the on-demand database service environment 200 via the pod 244. In some implementations, the hardware or software framework of an app server 288 is configured to execute operations of the services described herein, including performance of the blocks of various methods or processes described herein. In some alternative implementations, two or more app servers 288 can be included and cooperate to perform such methods, or one or more other servers described herein can be configured to perform the disclosed methods. In various implementations, the app servers 288 may be the same or similar to the app servers 100 discussed herein.

The content batch servers 264 can handle requests internal to the pod. Some such requests can be long-running or not tied to a particular customer. For example, the content batch servers 264 can handle requests related to log mining, cleanup work, and maintenance tasks. The content search servers 268 can provide query and indexer functions. For example, the functions provided by the content search servers 268 can allow users to search through content stored in the on-demand database service environment. The file servers 286 can manage requests for information stored in the file storage 298. The file storage 298 can store information such as documents, images, and basic large objects (BLOBs). By managing requests for information using the file force servers 286, the image footprint on the database can be reduced. The query servers 282 can be used to retrieve information from one or more file systems. For example, the query system 282 can receive requests for information from the app servers 288 and transmit information queries to the NFS 296 located outside the pod.

The pod 244 can share a database instance 290 configured as a multi-tenant environment in which different organizations share access to the same database. Additionally, services rendered by the pod 244 may call upon various hardware or software resources. In some implementations, the ACS servers 280 control access to data, hardware resources, or software resources. In some implementations, the batch servers 284 process batch jobs, which are used to run tasks at specified times. For example, the batch servers 284 can transmit instructions to other servers, such as the app servers 288, to trigger the batch jobs.

In some implementations, a QFS 292 is an open source file system available from Sun Microsystems. of Santa Clara, Calif. The QFS can serve as a rapid-access file system for storing and accessing information available within the pod 244. The QFS 292 can support some volume management capabilities, allowing many disks to be grouped together into a file system. File system metadata can be kept on a separate set of disks, which can be useful for streaming applications where long disk seeks cannot be tolerated. Thus, the QFS system can communicate with one or more content search servers 268 or indexers 294 to identify, retrieve, move, or update data stored in the network file systems 296 or other storage systems.

In some implementations, one or more query servers 282 communicate with the NFS 296 to retrieve or update information stored outside of the pod 244. The NFS 296 can allow servers located in the pod 244 to access information to access files over a network in a manner similar to how local storage is accessed. In some implementations, queries from the query servers 282 are transmitted to the NFS 296 via the load balancer 228, which can distribute resource requests over various resources available in the on-demand database service environment. The NFS 296 also can communicate with the QFS 292 to update the information stored on the NFS 296 or to provide information to the QFS 292 for use by servers located within the pod 244.

In some implementations, the pod includes one or more database instances 290. The database instance 290 can transmit information to the QFS 292. When information is transmitted to the QFS, it can be available for use by servers within the pod 244 without using an additional database call. In some implementations, database information is transmitted to the indexer 294. Indexer 294 can provide an index of information available in the database 290 or QFS 292. The index information can be provided to file force servers 286 or the QFS 292.

Direct Injection and Tickle Mechanisms for Triggered Sends

Figure 3:
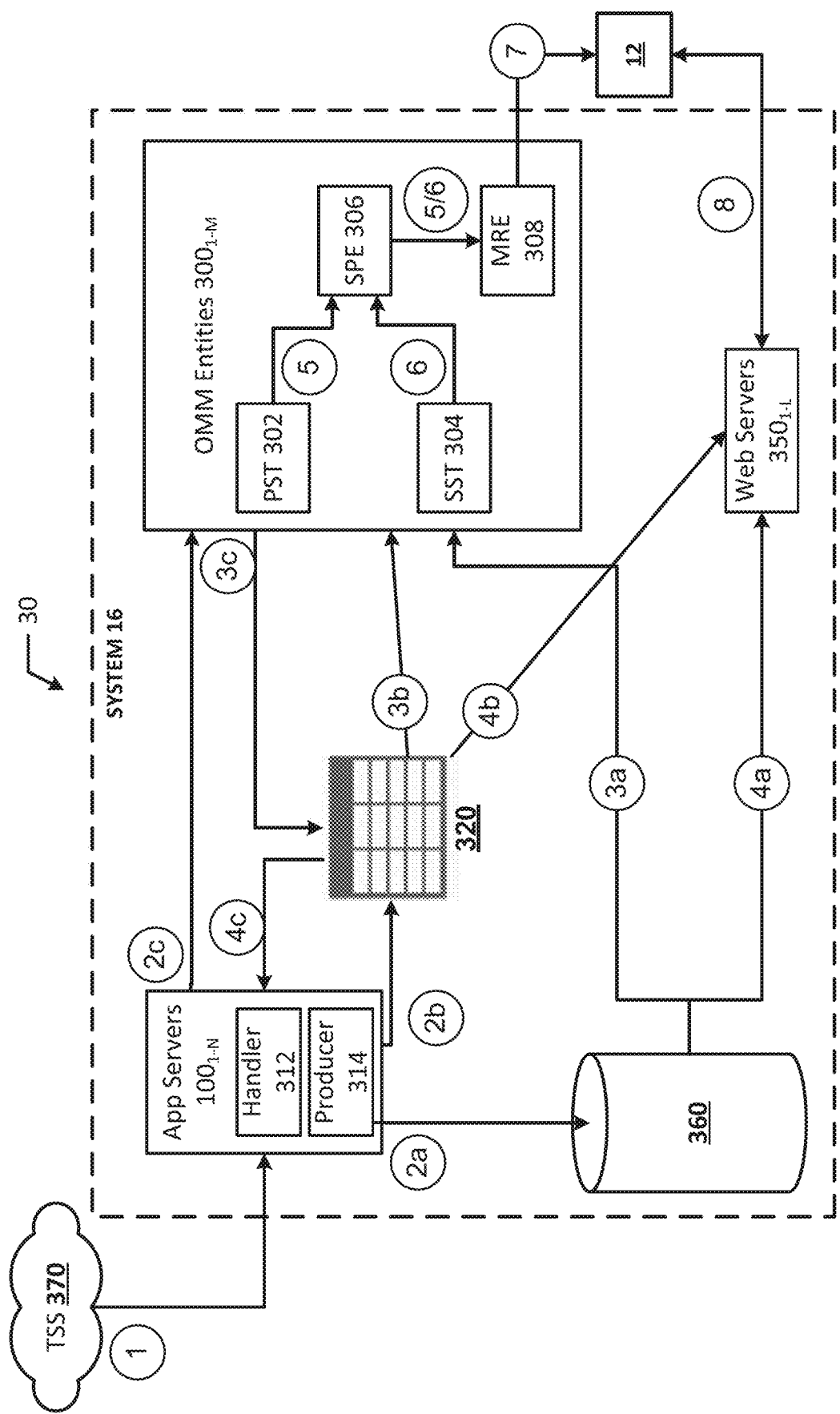
FIG. 3 shows an arrangement in which various embodiments discussed herein may be practiced.

FIG. 3 shows an arrangement 30 in which the components of the database system 16 may interact with components of a user system 12 and a triggered send subscriber (TSS) platform 370 (also referred to as "TSS 370") in accordance with various embodiments. In FIG. 3, like numbered items are as described with respect to FIGS. 1A-2B (although not all items shown by FIGS. 1A-2B are shown by FIG. 3). In the example shown by FIG. 3, the database system 16 may implement app servers $100_{1-N}$ (collectively referred to as "app servers 100" or as an "app server 100"), Outgoing Message Manager (OMM) entities $300_{1-N}$ (collectively referred to as "OMM entities 300" or "OMM entity 300"), Persisted Work Queue (PWQ) 320, non-relational datastore 360, and web servers $350_{1-N}$ (collectively referred to as "web servers 350" or "web server 350").

According to various embodiments, the database system 16 may implement a push model mechanism in addition to an already existing pull model design. In some embodiments, a View As a WebPage (VAWP) mechanism may also be utilized by the system 16. This hybrid approach may include using the push model for immediate/urgent/high-priority messages, and using the pull model for less urgent messages. Using the hybrid approach, the system 16 can maintain resiliency while providing low latency for high-priority messages. This is because the pull model may be more resilient than the push model while having relatively large latencies, and the push model may be somewhat less resilient than the pull model while providing relatively low latency.

Referring to FIG. 3, app servers 100 may receive requests for triggered sends from the TSS 370 (e.g., node 1). The TSS 370 may be a user/tenant of the database system 16 (e.g., a tenant/organization (org) or developers associated with the tenant) that may develop applications and/or platforms that interact and/or integrate with the database system 16 and utilize data from an associated tenant space in tenant DB 22. The TSS 370 may obtain data from the associated tenant space to render/display visual representations of relevant tenant data. In some cases, the applications/platforms may utilize tenant data for interacting with user systems 12 by, for example, sending messages to various user systems 12 (e.g., clients/customers of the tenant TSS 370) via the database system 16. To do so, the TSS 370 may operate/implement program code or script(s) that call an API to create and execute the sending of these messages based on various triggering events. These messages may be referred to as "triggered sends", "trigger messages", and/or the like.

Triggered sends are messages that may be sent to individual recipients (e.g., a subscriber, client, customer, etc. operating user systems 12) based on triggering events. A triggering event (or trigger event) may be any type of event or action, which may or may not be based on a user, device, or system interaction with the TSS 370. The trigger events, and predetermined messages (e.g., message content and type of message) corresponding to the trigger events, may be defined by the owner/operator/developers of the TSS 370 using a triggered send definition. For example, a trigger event may include completion of an online form, submitting a purchase order, performing a search, abandoning an online form or a shopping cart, failing to login after a number of login attempts, resetting a user name or password, signing up to an email list, requesting more information etc. The triggered sends can be sent as emails, push notifications, Short Message Service (SMS)/Multimedia Message Service (MMS) messages, over-the-top (OTT) messages, and/or any other suitable message type.

When an individual trigger event occurs, the TSS 370 may call an API that may cause generation and transmission of corresponding trigger send message to a particular recipient. The API may be a Representational State Transfer (REST or RESTful) API, Simple Object Access Protocol (SOAP) API, Apex API, and/or some other like API. In one example, the API may be a RESTful API, where an REST API endpoint accepts triggered send requests (TSRs) with send time data in a JSON payload. These messages may be sent in batches, and in some implementations, the API may include separate calls for single and batch subscriber triggered send submissions.

The app server 100 may accumulate TSR information in PWQ 320 (e.g., node 2b), which may be processed when an OMM entity 300 periodically checks the PWQ 320 to discover available processing jobs (e.g., node 3b). The PWQ 320 may be one or more database objects used to store various TSR information in association with various other information as discussed herein, which may be stored in the tenant DB 22, the system DB 24, or a combination thereof. Querying the PWQ 320 by the OMM entities 300 may result in several seconds to several minutes of delay between the receipt of the request and the sending of a message, which may be acceptable for some low-priority applications. However, higher-priority applications may require a more immediate message sends. Examples of such higher-priority applications may include password reset requests, critical alerts (e.g., disaster-related, security-related, etc.), vehicular traffic efficiency and safety messages, messages for remote systems control, among others.

In embodiments, the TSRs may include TSR information and a TSR payload. The TSR information and TSR payload may be located in a payload (body) portion of an HTTP message, which may be in HTML, XML, JSON, and/or some other suitable format and variants thereof. In embodiments, the TSR information and/or TSR payload may be designed to allow multiple subscribers to be included in a single request to be efficiently broken out and queued as individual entries in one or more queue tables.

The TSR information may include a client identifier (ID) (also referred to as a "tenant ID", "org ID", and the like) that indicates/identifies a sending client or TSS (e.g., TSS 370), a TS ID that indicates/identifies a universally unique ID (UUID) of the TSR, a TSR Job ID (request ID) that indicates/identifies a UUID of the TSR Job and/or the request, and a priority indicator/indication that indicates/identifies a priority of the TSR payload. The priority information may indicate a priority or rank associated with the TSR payload using levels (e.g., high, medium, low), a number scheme (e.g., 1 through 10), or an amount of time to delivery (e.g., by a specified time/date, a specified number of seconds, etc.).

The TSR payload may include both recipient specific attributes that are used to build a personalized message from a template or TSR definition, fully rendered content specific to the recipient, or some combination thereof. The TSR payload may be located in the payload (body) portion of the HTTP message and may be in HTML, XML, JSON, and/or some other suitable format and variants thereof. For example, the TSR payload may include a TSR definition or a TSR definition ID. The TSR definition ID may indicate a location/address of a TSR definition associated with the TSS 370, which may be used to access the TSR definition to build a message for intended recipients.

The TSR definition (also referred to as a "TSR template", "TSR configuration", "send classification", and the like) may be a configuration or policy that is used to send and track built messages. The TSR definition may define various parameters for TSR jobs that may be reused for multiple triggered sends or trigger events. The TSR definition may include content to be sent when a particular trigger event occurs. For example, the TSS 370 (or associated developers) may set rules to generate personalized media and dynamic content for particular users/clients/customers. The TSR definition may also include destination management tools, which allows a TSS/developer to define target recipients (e.g., one or more user systems 12) or user/customer/subscriber lists of recipients to receive the built messages, and particular message delivery mechanisms to be used for building and sending the messages (e.g., using SMS/MMS, OTT, push notifications, email, etc.). The TSR definition may also allow the TSS/developers to define various send options, which specify how a particular interaction tracks statistics from the TSRs and/or built messages.

The database system 16 may provide a development environment, programming language, and/or tools (collectively referred to as a "development environment", "dev-environment" and the like) that allows SPP 370/developers to create/edit TSR definitions. As examples, the dev-environment may be or include a software development environment (SDE), an integrated development environment (IDE), a software development kit (SDK), a software development platform (SDP), a schema builder, a modeling language application, a source code editor, build automation tools, debugger, compiler, interpreter, and/or some other like platform, framework, tools, etc. that may assist a developer in building an application or defining a TSR definition. In some implementations, the dev-environment may be a standalone application, or may be a web-based or cloud-based environment (e.g., a native application, a web application, or a hybrid application including GUIs that render an SDE/IDE/SDK/SDP implemented by a backend service (e.g., database system 16, a cloud service provider, etc.) in a web browser or container). Furthermore, dev-environment may allow the TSS 370/developers to define multiple triggered sends that the database system 16 may accept via API requests. For example, the TSS 370 may define individual triggered sends for account balance alerts, account security alerts, account activity acknowledgements, etc. In addition, the dev-environment may also allow the TSS 370/developers to deactivate the triggered send functionality, and to review triggered send messages before they are sent to their intended recipients.

The app server 100 that receives the trigger send request may perform a verification procedure on the TSR information and payload to determine if the message is a high-priority triggered send. In the example shown by FIG. 3, the app server 100 may implement an API handler 312 (also referred to as "handler 312") to perform light weight validation to confirm that required data elements are present in the TSR message obtained from the TSS 370; whether the message includes valid syntax; etc. The handler 312 may validate the TSR by loading the request information and/or payload of the TSR and performing in-memory checks against cached data. The handler 312 may pass the TSR to a producer component 314 (also referred to as "producer 314") that determines the particular database (or database object(s)) hosting the TSR job queue for the sending client (e.g., TSS 370). The producer 314 may also write the TSR payload to datastore 360 (e.g., node 2a).

A static instance of the producer 314 may be implemented in a process space of the app server 100 (e.g., process space 28 and/or system process space 102 shown and described with respect to FIGS. 1A-1B). The producer 314 may maintain a local managed cache that maps active triggered sends to a TSS queue. In some implementations, the TSS queue may be located in a tenant space of the tenant DB 22, and the map may indicate a (physical or virtual) memory location of the TSS queue; socket, port number, address, etc. of the data storage device storing the TSS queue; and/or other like parameters.

When the handler 312 determines that a TSR should be processed and sent with low latency, the app server 100 may select an OMM entity 300 to process the request and establish a direct two-way communication link with the selected OMM entity 300. Two types of direct communication between the app server 100 and selected OMM entity 300 are supported in various embodiments.

A first type of direct communication may include a tickle mechanism, which may involve the app server 100 sending a message to the selected OMM entity 300 that triggers a particular message server of the OMM entity 300 (a "consumer") dedicated to the triggered send to start processing queued messages from the TSS queue. For example, when a medium priority or high priority TSR is received by an app server 100 (e.g., node 1), the app server 100 may send a tickle notification message to the OMM entity 300 (e.g., node 2c), which may cause the OMM entity 300 to transition from an idle state to an active state in order to access the TSS queue and begin message processing.

A second type of direct communication may include a direct injection mechanism, which may involve the app server 100 sending the entire TSR and payload directly to the message server for immediate processing. For example, when a high priority TSR is received by an app server 100 (e.g., node 1), the app server 100 may send a payload of the request directly to the OMM entity 300 (e.g., node 2c) for processing. Direct injection may be used to send messages to OMM entities 300 directly so that they can immediately process the request rather than wait for the eventual polling of the PWQ 320 to see if work (jobs) is/are available. Additionally, the app server 100 may pass the request payload directly to an OMM entity 300 to avoid the overhead of having to retrieve the payload from the PWQ 320.

The direct two-way communication link/channel between an app server 100 and an OMM entity 300 may be established via an Ethernet connection, a message passing interface (MPI) implementation, a network socket connection (e.g., which may be connectionless, connection-oriented, or raw) and/or any other suitable networking technology. In various embodiments, a new implementation of the WebSocket API may be used to provide the direct injection and/or tickle message. Typically, the WebSocket protocol is used to provide a one-to-one communications session between web browsers and servers so client systems can send messages to a server and receive event-driven responses without having to poll the server for a reply. In embodiments, the new WebSocket implementation may provide a one-to-many communications sessions between various servers (e.g., between an app server 100 and multiple OMM entities 300 or message servers). Furthermore, the new implementation of WebSocket used in various embodiments may utilize existing setup/teardown/framing over TCP, provide bi-directional messaging using unsolicited server (e.g., app server 100) to client events (e.g., OMM entity 300 processes), streaming of arbitrary message sizes, and use HTTP and REST calls on the same server port. In embodiments where the WebSocket API is used, the messages communicated between the app servers 100 and the OMM entities 300 may include headers and/or payloads in a same or similar format as specified by I. Fette et al., "The WebSocket Protocol", RFC 6455, December 2011, https://toolsdefforg/html/rfc6455 ("RFC-6455"); and T. Yoshino, "Compression Extensions for WebSocket", RFC 7692, December 2015, https://tools.ietf.org/html/rfc7692 ("RFC-7692"), each of which are incorporated by reference in their entireties.

In embodiments, tickle messages may include some or all of the request information, whereas the direct injection messages may include some or all of the request information and the TSR payload. The request information in a tickle or direct injection message may be located in a header or a payload (body) portion of HTTP messages used to convey the tickle messages. For direct injection messages, the TSR payload may be located in the payload (body) portion of the HTTP messages. The payload of these HTTP messages may be in HTML, XML, JSON, and/or some other suitable format and variants thereof. In some embodiments the payload of the tickle and direct inject messages may be in a MessagePack™ format, which is an object serialization format that is similar to, but smaller than JSON.

In embodiments, each app server 100 may maintain an in-memory state that identifies particular OMM entities 300, which may allow the app servers 100 to bundle up urgent messages and send them directly to the particular OMM entity 300. The in-memory state may comprise lease information that is consumed by the app servers 100 from a centralized lease database (DB) (e.g., node 4c), and the app servers 100 may allocate triggered send requests to particular OMM entities 300 based on the stored lease information (e.g., for node 2c). When an app server 100 directly injects a triggered send request (or sends a tickle message) to an OMM entity 300 (e.g., node 2c), the OMM entity 300 may take out a lease to process the direct injection request (or tickle) (e.g., node 5). The lease may then be published to the central lease DB (e.g., node 3c), which stores all of the lease information for all of the OMM entities 300 in the system 16. In the example shown by FIG. 3, the PWQ 320 may include the lease DB; however, in other embodiments the lease DB may be implemented as a different/separate logical and/or physical entity than the PWQ 320.

The lease may be a guarantee that particular computing resources will be available to process the requests for a predetermined amount of time, and that the OMM entity 300 will hold onto various metadata needed to process the request in memory for the predetermined amount of time. Leasing for triggered sends keeps a primary slot/thread (PST) 302 of an OMM entity 300 alive waiting for more work during the lease period. Using the lease mechanism, performance increases may be realized by avoiding calls to the system DB (e.g., DB 24 discussed with respect to FIGS. 1A-1B) on the queuing side since lease database objects may be stored in a member DB (e.g., tenant DB 22 discussed with respect to FIGS. 1A-1B), which may reduce slot & data load overhead. The lease DB may be consumed by all of the app servers 100 (e.g., node 4c) and stored in their local memory (e.g., persisted in memory as discussed previously). In this way, each app server 100 can identify currently available OMM entities 300 for direct injection/tickles for triggered send requests without relying on using network calls to determine addresses of available OMM entities 300. Additionally, when an app server 100 identifies an available OMM entity 300 for direct injection or a tickle, the app server 100 may establish a communications session with the available OMM entity 300 over the direct two-way communication link/channel.

The app server 100 may determine the statuses of various TSR consumers (e.g., virtual or physical message servers of the OMM entities 300), which may indicate whether the various consumers are active, inactive, or leased for a particular period of time. An in-memory cache of the app servers 100 may provide a mapping of machine server identifiers to message server full names to support the direct two-way network connections via WebSocket or other like direct connections. The app servers 100 may call or otherwise access their local memory to obtain an identifier for TSR consumers (e.g., particular virtual or physical message server that is to process the request) and the corresponding lease status. An example of different lease statues for various consumers is shown by table 1(a).

TABLE 1(a)

| Service Machine ID | Triggered Send ID | Lease Status | Lease Time |
|---|---|---|---|
| 66469a2a-a2df-4bf2-89a9-3658ba7dfafd | 7de342db-df3e-4883-8569-a48828242b8d | Inactive | 0 seconds |
| 88b98c13-35a5-48d2-8538-1dc43df68820 | 193e372e-0226-4cca-ae12-e1494d523928 | Leasing | 35 seconds |
| 5d24d830-ccae-4906-8e73-2836f0d8c2db | fd47aa79-f992-43de-a6a9-cca647e123fd | Leased | 60 seconds |

TABLE 1(a)-continued

| Service Machine ID | Triggered Send ID | Lease Status | Lease Time |
|---|---|---|---|
| e1bda2c7-52de-4462-a31e-3c94681fb359 | a20583a3-2235-4e84-b148-c75380b964a7 | Leasing | 90 seconds |
| 20b8c524-7d56-420c-8e-2128565b54a4 | 3770e6d6-dea5-4bc3-87a0-05a974226ede | Inactive | 0 seconds |

In the example of table 1(a), the "Triggered Send ID" field may a UUID of TSR to which a particular OMM entity 300 is granting a lease; the "Service Machine ID" field (or OMMServiceMachineID) may indicate a UUID of a particular message server associated with an OMM entity 300; the "Machine Full Name" field may indicate an address of a particular message server; the "Lease Status" field may indicate a current lease status of a particular message server; and the "Lease Time" field may indicate the length of time of a currently active or scheduled lease. In the example of table 1(a), the Service Machine ID may be used as a foreign key to a second table or database object that provides the short and full names for various message servers and/or OMM entities 300. However, in other embodiments, the full names of the message servers may be included in table 1(a). In either embodiment, the machine full name may be a resolvable fully qualified domain name (FQDN), however in other embodiments, other address types may be used. In an example, determining a particular message server that owns a lease, the machine full name can be queried from:

SystemDB.OMMServiceMachine.ServiceMachineID
→MachineFullName="ETINKKING01.et.local"

In embodiments, the service machine ID may be based on a hardware ID or virtual hardware ID (e.g., where the message servers are implemented as virtual machines or application containers), and/or generated using any suitable random character/number generator, hash function, etc. In some embodiments, the service machine ID may be, or may be based on a (virtual or physical) memory location of a slot of the primary slots/threads (PST) 302 (discussed infra) in which the TSR job metadata may be stored. Furthermore, different lease times may be configured for different priority indications and/or different message delivery mechanisms. An example of different lease times for various message types and priorities is shown by table 1(b).

TABLE 1(b)

| Message Type | Priority Indication | Lease Time |
|---|---|---|
| Push Notification | High, Medium, Low | 30 seconds |
| Email | High, Medium | 35 seconds |
| Email | Low | 60 seconds |
| SMS/MMS | High, Medium, Low | 90 seconds |
| OTT | High, Medium, Low | 90 seconds |

In the example of table 1, each of the message delivery mechanisms (message types) have a different lease time, which may be based on the time/resource requirements for processing each type of message. In this example, the low priority indication may be used to indicate that the message does not need to be delivered with low latency, and the pull mechanism may be used for such messages. The medium priority indication in this example may be used to indicate that the message may or may not be delivered with low latency, and that either push mechanism (e.g., tickle or direct injection) may be used for such messages. The particular push mechanism used for medium priority triggered send messages may be based on load and/or lease criteria for various OMM entities 300. The high priority indication in this example may be used to indicate that the message must be delivered with low latency, and that the push-direct injection mechanism should be used for such messages.

The OMM entities 300 may comprise pools of servers (also referred to as "message servers"), associated data storage devices, and/or other like computer devices dedicated to running/executing message management/processing processes, procedures, mechanisms, etc. In embodiments, the OMM entities 300 may process the content of messages received from various entities of the system 16 to transform such messages into a desired outgoing message format. For outgoing messages, the OMM entities 300 may convert the messages from an internal format/representation used by the entities of the system 16 to a format that can be consumed by external entities (e.g., user systems 12).

Each of the OMM entities 300 may operate a Subscriber Processing Entity (SPE) 306, which may process trigger send request messages directly injected into the primary slots/threads (PST) 302 and trigger send request messages pulled into the secondary slots/threads (SST) 304 from the PWQ 320. The PST 302 may also store tickle messages or various data contained in a tickle message in some implementations. The PST 302 may be one or more database objects stored in a local memory of the message server or OMM entity 300, and may be referred to as an "in-memory queue" or the like. The SST 304 may be a locally stored version of the PWQ 320, or portions thereof, which is obtained by the OMM entities 300 during pull processing. In some embodiments, the OMM entities 300 may implement individual SPEs 306, PSTs 302, and SSTs 304 for individual customers/tenants, each which may be referred to as a "consumer process" or an individual "instance of a consumer process." Further, the PST 302 and/or SST 304 of each consumer process instance may have a configured size, storage limit, threshold, etc. which can be adjusted based on various criteria, subscriber data, current or previous resource utilization, and/or the like.

In embodiments, each slot of the PST 302, the SST 304, PWQ 320, and the TSS queue may include/store a triggered send request job (TSRJ). A TSRJ may be a row, record, or other like database object that stores various values, statistics, metadata, etc. during the lifecycle of the triggered send message, and which may be used for processing the TSRJ. Each TSRJ may include various fields for storing relevant TSR information, such as a job ID (JobID) field or request ID (requestID) field, a client ID (clientID) field, a triggered send ID (TsID) field, a priority field, schedule information field, a payload field, and/or the like fields. The TSRJ may include more or less fields depending on whether the TSRJ is stored in the PST 302, the SST 304, PWQ 320, or the TSS queue.

In one example, each TSRJ may be a row in a table, where some or all of the aforementioned fields are columns in the table. In another example, the domain keys DB 323 may be embodied as a hash table that stores key-value pairs (where the key of the key-value pair is different than the domain integrity/encryption keys). In this example, a key or other like identifier may be used to obtain an index (e.g., a domain index) that indicates where a value (e.g., a domain integrity/encryption key) of the key-value pair may be found in the domain keys DB 323. In this example, the domain keys DB 323 may be built using the perfect hashing scheme, cuckoo hashing, or some other suitable hashing scheme. The domain keys DB 323 may be built or formed using any other suitable mechanism/procedure in other embodiments, and the methods/procedures to access the domain keys may be based on how the domain keys DB 323 is constructed The app servers 100 may perform direct injections as long as the SPE 306 of each OMM entity 300 is able to keep up with the incoming traffic. For example, the SPE 306 may continue to obtain and process trigger send requests until the configured threshold of the PST 302 and/or SST 304 is reached. If an app server 100 attempts to directly inject a request or request set that would overload the PST 302, for example, a circuit breaker may be tripped and the consumer process may no longer accept directly injected messages. The basic idea behind the circuit breaker is very simple. The term "circuit breaker" used herein may refer to physical or logical (e.g., application or program code) implementation that detects and encapsulates failures to prevent further failures. In one example, the consumer process may be wrapped in a circuit breaker object that monitors for failures, and once a failure is detected or a threshold amount of failures occur, the circuit breaker object trips, and all further calls to the circuit breaker return with an error. Additionally, an alert, flag, indication, or some other suitable message may be provided to a calling entity when the circuit breaker trips.

In embodiments, when the circuit breaker is tripped, the OMM entity 300 may perform any one or more of the following procedures/operations: (a) send a queue overflow message to the app server 100 to instruct the app server 100 to fall back to using the tickle mechanism; (b) implement the overloaded (primary) consumer process to evaluate the PST 302/SST 304 queue depth and launch additional secondary consumer processes across the message server pool/farm to handle the volume spike; (c) implement the primary consumer to empty the in-memory queue and fall back to consuming from the database queue until all work is exhausted; (d) Once all of the triggered send requests are processed, the secondary processes will shut down, the primary process will idle for the configured lease period until the lease is extended by the arrival of more requests or eventually the lease period expires; and (e) when the lease period expires the primary consumer process on the message server may terminate and the circuit breaker may be reset.

Each of the OMM entities 300 may include a Message Rendering Entity (MRE) 308, which may generate messages (see e.g., node 5/6) and send the generated messages to individual recipients, such user systems 12 (see e.g., node 7). The MRE 308 may include or operate various message processing applications and protocols to generate and transmit the messages. For example, the MRE 308 may be or operate mail transfer agent (MTA) applications to receive and transfer email messages to/from various user systems 12 in accordance with Simple Mail Transfer Protocol (SMTP), extended SMTP, Post Office Protocol 3 (POP3), Internet Message Access Protocol (IMAP), and/or the like. In another example, the MRE 308 may provide push notification services using Webpush, HTTP server push, WebSocket, etc. to provide push notifications to various user systems 12. In another example, the MRE 308 may act as External Short Messaging Entities (ESMEs) that implement SMS server/gateway applications and/or implement the Short Message Peer-to-Peer (SMPP) protocol to send/receive SMS/MMS messages to user systems 12 via Short Message Service Centers (SMSC). In another example, the MRE 308 may implement various streaming technologies or protocols to generate and broadcast and/or send/receive OTT messages.

Embodiments herein may also use push (e.g., direct injection/tickle) mechanisms, pull mechanisms, and VAWP mechanisms in parallel. In these embodiments, the app servers 100 may send triggered send message payloads to the non-relational datastore 360 with a specified time to live (TTL) parameter without being processed by the OMM entities 300 (e.g., node 2a). The triggered send message payload may then be accessed by web servers 350 (e.g., node 4a), which may be made accessible to the recipient user system 12 via a web server 350 for the TTL (e.g., node 8). Such implementations may be used as a backup system/mechanism for when the direct injection/tickle mechanisms (e.g., communication session failures, or the like).

The datastore 360 may comprise one or more data storage devices that act as a repository for persistently storing and managing collections of data according to a predefined database structure. Additionally, the datastore 360 may be a distributed data store comprising a network of a plurality of data storage devices. In various implementations, the datastore 360 may be a non-relational datastore and/or may employ a non-relational distributed database structure (sometimes referred to as a NoSQL database) that includes various database objects that are not stored using relations. In various implementations, the stored database objects may be immutable (e.g., once created and populated, such objects cannot change their form) and accessible using a suitable scripting language (e.g., Apache™ Pig™ Latin). Example implementations of datastore 360 may include Gridforce provided by Salesforce.com®, BigObjects provided by Salesforce.com®, HBase™ provided by Apache™ Software Foundation which runs on top of Apache™ Hadoop®, BigTable provided by Google®, and/or the like. In various embodiments, the non-relational datastore 360 may be used to store TSR payloads (e.g., HTML, XML, JSON payloads, etc.), which may include both recipient specific attributes that are used to build a personalized message from a TS definition/template or fully rendered content specific to the recipient, or some combination thereof.

Arrangement 30 of FIG. 3 may operate as follows. At node 1, app servers 100 may receive triggered send requests from one or more SPPs 370. Push processing, pull processing, and View As a WebPage (VAWP) mechanisms may be performed simultaneously.

The VAWP mechanism may include, at node 2a, the app servers 100 storing the triggered send request (TSR) payload including recipient data properties and message content to the non-relational datastore 360, and the app servers 100 may log TSR information to the PWQ 320 at node 2b. The web servers 350 may obtain the triggered send payloads from the datastore 360 at node 4a and may obtain the triggered send message information from the PWQ 320 at node 4b. At node 8, the user system 12 may retrieve message attributes from one or more web servers 350 and render an HTML version of the message.

The pull processing may include, at node 2b, the app servers 100 logging/storing TSR information in the PWQ 320 and the TSR information may be obtained by the OMM entities 300 from the PWQ 320 at node 3b. At node 3a, the triggered send payload may be obtained by OMM entities 300 from the non-relational datastore 360. At node 6, the SPE 306 and MRE 308 of the OMM entities 300 may process queued messages from the secondary slots/threads (SST) 304, which may be consumed from the PWQ 320. In one example, at node 3b the OMM entities 300 may poll the PWQ 320 on a periodic basis, and consume various slots of the PWQ 320 for storage in the SST 304. In this example, the OMM entities 300 may obtain the TSR payloads from the datastore 360 when processing each TSR job of the SST 304 in turn. In another example, the OMM entities 300 may poll and obtain TSR information and TSR payloads from the PWQ 320 at node 3b. At node 7, the OMM entities 300 may send the built messages to user system 12.

The push processing may include, at node 2c, the app servers 100 establishing a direct two-way communication session with a selected OMM entity 300. Prior to engaging in the push processing, the TSR information and/or TSR payload may be stored in a triggered send subscriber (TSS) queue, which may be located in a same database (DB) as the PWQ 320 or a different DB than the PWQ 320 (e.g., this may occur at node 2b in some implementations). There may be two types of direct communication between the app server 100 and the selected OMM entity 300, (1) a "tickle" where the app server 100 may send an activation or wakeup message to the OMM entity 300 that wakes or activates the OMM entity 300 dedicated to the triggered send from an idle state so that the OMM entity 300 may immediately pick up queued work/jobs, or (2) a "direct injection" where the app server 100 may stream or send the entire TSR (including TSR information and TSR payload) directly to the OMM entity 300 for immediate processing. The TSRs may be streamed using the direct injection or the tickle mechanism. At node 3c, the OMM entities 300 may record lease information (e.g., state and status of various slots of the PST 302) in the PWQ 320 or some other central lease DB, and at node 4c, the app servers 100 may consume the lease information from the PWQ 320 or central lease DB on a periodic basis and/or in response to a trigger (e.g., receiving a TSR or the like). At node 5, the SPE 306 and MRE 308 of OMM entities 300 may build messages from PST 302 (in-memory queue). At node 7, the OMM entities 300 may send the built messages to user system 12.

FIGS. 4-9 illustrates various processes for practicing the example embodiments discussed herein. For illustrative purposes, the operations of processes of FIGS. 4-9 are described as being performed by elements/components/devices shown and described with regard to FIGS. 1A-3; however, other computing devices may operate the depicted processes in a multitude of implementations, arrangements, and/or environments. In embodiments, the processes may be embodied as program code stored in a memory system, which when executed by a processor system of a computer system, causes the computer system to perform the various operations of such processes. While particular examples and orders of operations are illustrated in FIGS. 4-9, in various embodiments, these operations may be re-ordered, separated into additional operations, combined, or omitted altogether.

Figure 4:
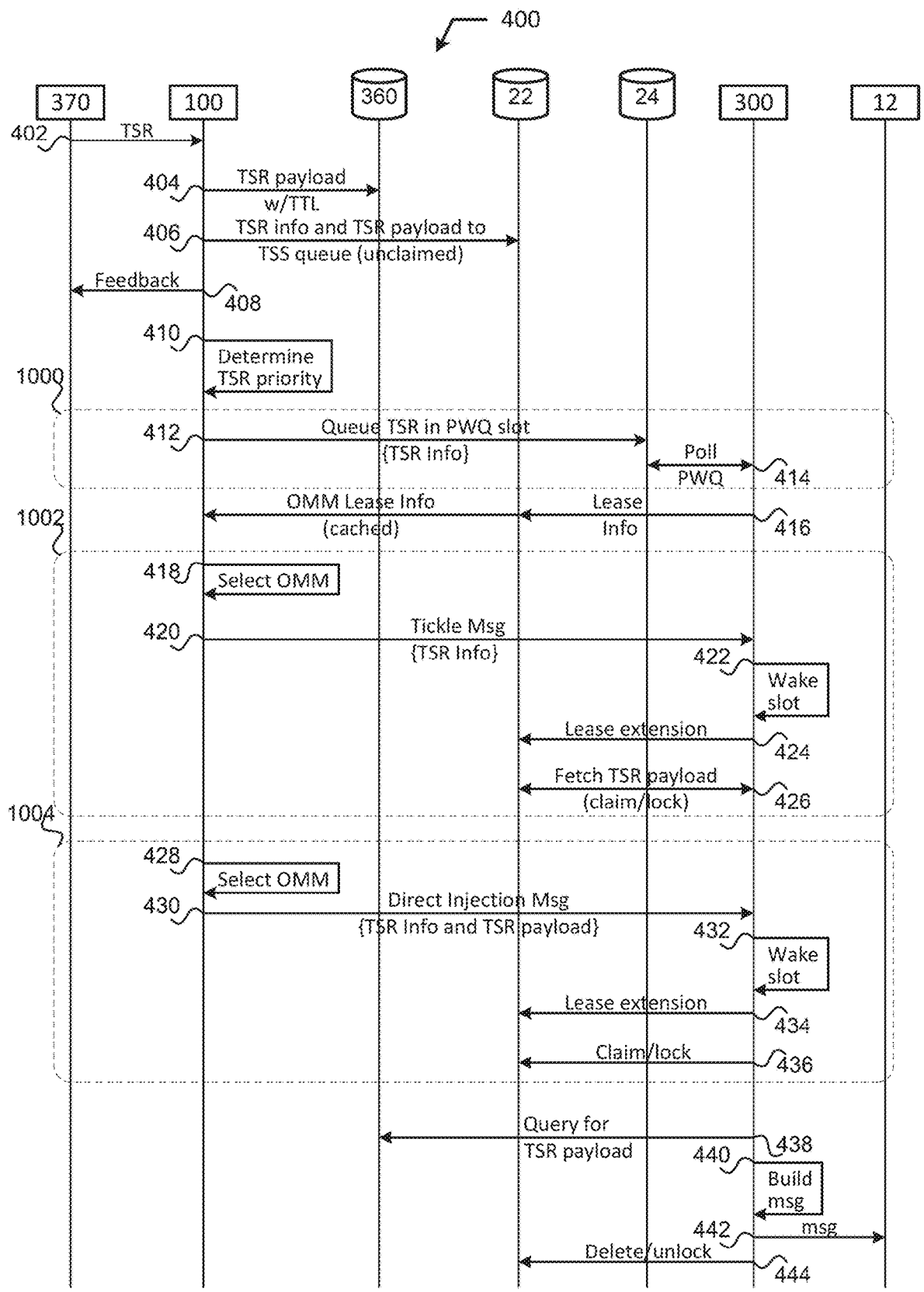
FIG. 4 shows a process for practicing the various embodiments discussed herein.

FIG. 4 illustrates a process 400 for processing and sending triggered sends in accordance with various embodiments. Process 400 may begin at operation 402 where the TSS 370 may send a triggered send request (TSR) to an app server 100. At operation 404, the app server 100 may send the TSR payload to the datastore 360 for storage with a time-to-live (TTL) parameter. The stored TSR payload may be retrieved for a VAWP mechanism as discussed previously and may be made available for a time period equal to the TTL, and may be deleted from the datastore 360 after the TTL period expires. At operation 406, the app server 100 may send TSR information and the TSR payload to the tenant/client DB for storage in a TSS queue associated with the TSS 370, which may be located in the tenant DB 22. Storage of the TSR information and/or TSR payload in the TSS queue may cause a TSR job to be created.

At operation 408, the app server 100 may send feedback to the TSS 370 to indicate whether the TSR has been properly obtained and processed by the app server 100 or not. In embodiments, the feedback may include an acknowledgement (ACK) to indicate success or a negative ACK (NACK) to indicate errors/failure. In one example, the ACK may be an HTTP message with a status code "202" to indicate that the request has been accepted for processing, but the processing has not been completed, and the NACK may be an HTTP message with a status code "400" to indicate that the request cannot be fulfilled due to bad syntax or status code "401" to indicate that the request was unauthorized. In another example, the NACK could also include the HTTP status code "413" to indicate "Payload Too Large." Other status codes, error messages, and/or other message types may be used in other embodiments.

At operation 410, the app server 100 may determine a priority of the TSR and/or other criteria/parameters for processing the TSR, such as a message delivery mechanism, subscription information, etc. Based on the priority, the app server 100 may initiate performance of pull process 1000, tickle process 1002, or direct injection process 1004.

To initiate performance of the pull process 1000, the app server 100 may proceed to operation 412 to queue the TSR information in a slot of the PWQ 320. In this example, the PWQ 320 may be located in the system DB 24 and the app server 100 may send the TSR information to the system DB 24 for storage. The TSR information may include a job ID (jobID), a priority indication, schedule information, and/or other like information/data. At operation 414, the OMM entity 300 may poll the PWQ 320 for TSR information on a periodic basis. After operation 414, the OMM entity 300 may perform operations 438-444 to build and send messages to intended recipient(s) (discussed infra).

Meanwhile, at operation 416 the app server 100 may obtain OMM lease information from the client (tenant) DB 22, and the lease information may be stored in a local memory/storage system of the app server 100. The lease information may be stored in a central lease database (DB) of the tenant DB 22 by the various OMM entities 300 on a periodic basis and/or in response to receipt of a direct injection message or tickle message (see e.g., operations 424 and 434 infra); and the app server 100 may consume the lease information from the central lease DB on a periodic basis. These periodic bases or periods may be the same or different. In embodiments, the lease information may be stored according to known web caching and/or HTTP accelerator mechanisms.

To initiate performance of the tickle process 1002, the app server 100 may proceed to operation 418 to select an OMM entity 300 based on the locally stored OMM lease information. In some embodiments, if the app server 100 determines that no OMM entities 300 are available (e.g., there are no open leases), the app server 100 may place the TSR in a queue and perform operation 418 after new lease information has been obtained and cached. In other embodiments, if the app server 100 determines that no OMM entities 300 are available (e.g., there are no open leases), the app server 100 may control storage of the TSR information in the TSS queue (e.g., by performing operation 406) to be processed by repeating tickle process 1002.

At operation 420, the app server 100 may send a tickle message (msg) to the selected OMM entity 300, which may include TSR information. The TSR information may include a client ID (clientID), a triggered send ID (TsID), a job/request ID (JobID or requestID), priority information, and/or other like information. The TSR information may be stored in corresponding fields of a TSRJ entity in a slot of the PST 302. An example tickle message is shown by table 2.

TABLE 2

Example tickle message

[various headers]
{
"ommRequest": "tstickle",
"requestId": "F6C3B5BC-0B5B-47C6-A265-1BAE422D568",
"clientId": 20720,
"tsId": "ff2bbcca-8cf1-4fb8-88ee-ca91b4142310",
"priority": "4"
}

In the example of table 2, the "ommRequest" field may include a textual ID of the request, which may be a name or message/request type (e.g., "tstickle" as shown by table 2); the "requestID" field may include a UUID of the request, which may be correlated with various responses to the tickle message (see e.g., tables 3 and 4 infra); the "clientID" field may include a member or tenant identifier (e.g., org_ID) of the entity sending the triggered send request, which may be referred to as a "triggered send subscriber" (e.g., the TSS 370); the "tsID" field may include a UUID of the triggered send request; and the "priority" field may include a priority level/value (or rank) of the triggered send. In this example, the priority is represented as an integer value, although in other embodiments the priority may be represented using characters or strings. In embodiments where the WebSocket protocol is used, the various headers of the tickle message may include one or more fields as specified by RFC-6455 and/or RFC-7692.

When the TSR job is to be processed/executed, at operation 422, the OMM entity 300 may wake the slot of PST 302 including the tickle msg information. In embodiments, if no slot exists, the OMM entity 300 may send an error response message to the app server 100 (not shown by FIG. 4), an example of which is shown by table 3. If the slot does exist, the OMM entity 300 may send a success response message to the app server 100 (not shown by FIG. 4) after successfully processing the triggered send requests, an example of which is shown by table 4.

TABLE 3

Example error response

[various headers]
{
"ommResponse": "error",
"requestId": "F6C3B5BC-0B5B-47C6-A265-1BAE422D568",
"errorCode": "MCMS_OMM_tsDoesNotExist",
"tsId": "ff2bbcca-8cf1-4fb8-88ee-ca91b4142310"
}

TABLE 4

Example success response

[various headers]
{
"ommResponse": "success",
"requestId": "F6C3B5BC-0B5B-47C6-A265-1BAE422D568"
}

In the example of tables 3 and 4, the "ommResponse" field may include a textual ID of the response, which may be a name or message/response type; the "errorCode" field may include a textual error code, which may indicate a particular error that was encountered. In the example of table 3, the error code is "MCMS_OMM_tsDoesNotExist", which may indicate that a slot associated with the triggered send ID does not exist. In embodiments where the WebSocket protocol is used, the various headers of the tickle response messages may include one or more fields as specified by RFC-6455 and/or RFC-7692.

Referring back to FIG. 4, at operation 424 the OMM entity 300 may update the lease information to include a lease extension for processing the triggered send request(s) of the tickle message, which may be consumed by various app servers 100. At operation 426, the OMM entity 300 may fetch the TSR payload and TSR information of one or more TSRs from the TSS queue associated with the TSS 370; the one or more TSRs in the TSS queue may have been received from various triggered send subscribers in a same or similar manner as discussed previously with regard to operations 402 and 406. When requesting (querying) the TSR information from the tenant DB 22, the OMM entity 300 may also claim the TSR jobs associated with the accessed TSR information. Claiming the TSR jobs may include locking the slots/records of the TSS queue including the desired TSR information. This may be done using a pessimistic locking mechanism (e.g., the records/slots are automatically locked by the database system 16 when accessed by the OMM entity 300); using an optimistic or explicit locking mechanism (e.g., by altering a record/slot type to be read-only record/slots, setting a binary semaphore, by calling a lock ( ) method in Apex implementations, etc.); and/or some other like locking mechanism. After operation 426, the OMM entity 300 may perform operations 438-444 to build and send messages to intended recipient(s) (discussed infra).

To initiate performance of the direct injection process 1004, the app server 100 may proceed to operation 428 to select an OMM entity 300 based on the locally stored OMM lease information. In some embodiments, if the app server 100 determines that no OMM entities 300 are available (e.g., there are no open leases), the app server 100 may place the TSR in a queue and perform operation 428 after new lease information has been obtained and stored in the local memory/storage system. In other embodiments, if the app server 100 determines that no OMM entities 300 are available (e.g., there are no open leases), the app server 100 may control storage of the TSR in the TSS queue (e.g., at operation 406, or by repeating operation 406) to be processed using the tickle process 1002.

At operation 430, the app server 100 may send a direct injection message (msg), which may include the TSR information (e.g., clientID, TsID, JobID, priority indication, etc.) and the TSR payload, which may be stored in a slot of the PST 302. In some embodiments, the TSR information and TSR payload may be sent in separate messages. The direct injection message may be the same or similar to the tickle message of table 2, where the "ommRequest" field may indicate that the message/request is for a direct injection, such as by including that string "tsDirectInject" or the like. In some embodiments, two direct injection messages may be used, where a first direct injection type may require a response from the OMM entity 300 and a second direct injection type may not require a response from the OMM entity 300. In such embodiments, the "ommRequest" field may be used to convey the direct injection type. In one example, the request message of the first direct injection type may be a common direct injection and the "ommRequest" field may include the string "tsComDirectInject" or the like. In another example, the request message of the second direct injection type may be "fire and forget" direct injection and the "ommRequest" field may include the string "tsFFDirectInject" or the like. In other embodiments, the "ommRequest" field may be absent when the direct injection is the first type of direct injection (e.g., where the app server 100 does not expect a response).

When the TSR job is to be processed/executed, at operation 432, the OMM entity 300 may wake the slot of the PST 302 including the TSR information and TSR payload. Operation 432 may be performed in a same or similar manner as operation 422 discussed previously. In embodiments, if no slot exists, the OMM entity 300 may send an error response message to the app server 100 (not shown by FIG. 4), which may be the same or similar to the example shown by table 3. If the slot does exist, the OMM entity 300 may send a success response message to the app server 100 (not shown by FIG. 4) after successfully processing the triggered send requests, which may be the same or similar to the example shown by table 4.

At operation 434 the OMM entity 300 may update the lease information to include a lease extension for processing the triggered send request(s) of the direct injection message, which may be consumed by various app servers 100. At operation 436, the OMM entity 300 may send a message to the tenant DB to claim/lock the TSR job/slots associated with the direct injection message. The locking mechanism may be the same or similar to the locking mechanism discussed previously with regard to operation 426. After operation 436, the OMM entity 300 may perform operations 440-444 to build and send messages to intended recipient(s) (discussed infra).

At operation 438, the OMM entity 300 may query the datastore 360 for the TRS payload. Operation 438 may be performed after performing processes 1000 and/or 10002. At operation 440, the OMM entity 300 may build a message to be sent to the intended recipients, such as one or more user systems 12, and at operation 442, the OMM entity 300 may send or control transmission of the message to the intended recipients.

In embodiments, the OMM entity 300 may send the built message to a BIND server (or implement a BIND application/service) to send the built message over a TCP/IP connection (e.g., using the bind( ) function with the recipient IP address and/or TCP port). As used herein, the term "BIND server" may be one or more servers or other suitable computer system(s) that is/are capable of sending SMPP BIND commands used for sending SMS/MMS messages. Examples of servers may include Wireless Application Protocol (WAP) proxy servers. External Short Message Entity (ESME) servers (e.g., a WAP proxy server, e-mail gateway/server, voicemail server, etc.), a tunnel server, and/or a system of such computer devices. In embodiments, the OMM entity 300 may send the built message to an aggregator (or implement an aggregator application/service, message-oriented middleware, mediation engine, etc.) to send the built message over an HTTP or WebSocket connection. In embodiments, the OMM entity 300 may send the built message to an SMS server/gateway (or implement an SMPP/ESME service/application) to send the built message as SMS/MMS messages. In some embodiments, built message send to the aggregator may be sent to the SMS server/gateway for transmission via SMS/MMS, or the built message sent to the BIND server may be sent to the aggregator, which may then be sent to the SMS server/gateway for transmission via SMS/MMS.

After the built message is sent to the intended recipients, the OMM entity 300 may send a message to the tenant DB to unlock and/or delete the TSR job at operation 444. After performance of operation 444, process 400 may be repeated as necessary or the process 400 may end. Furthermore, the previously discussed VAWP mechanism may be performed in parallel with processes 1000, 1002, and/or 1004.

Figure 5:
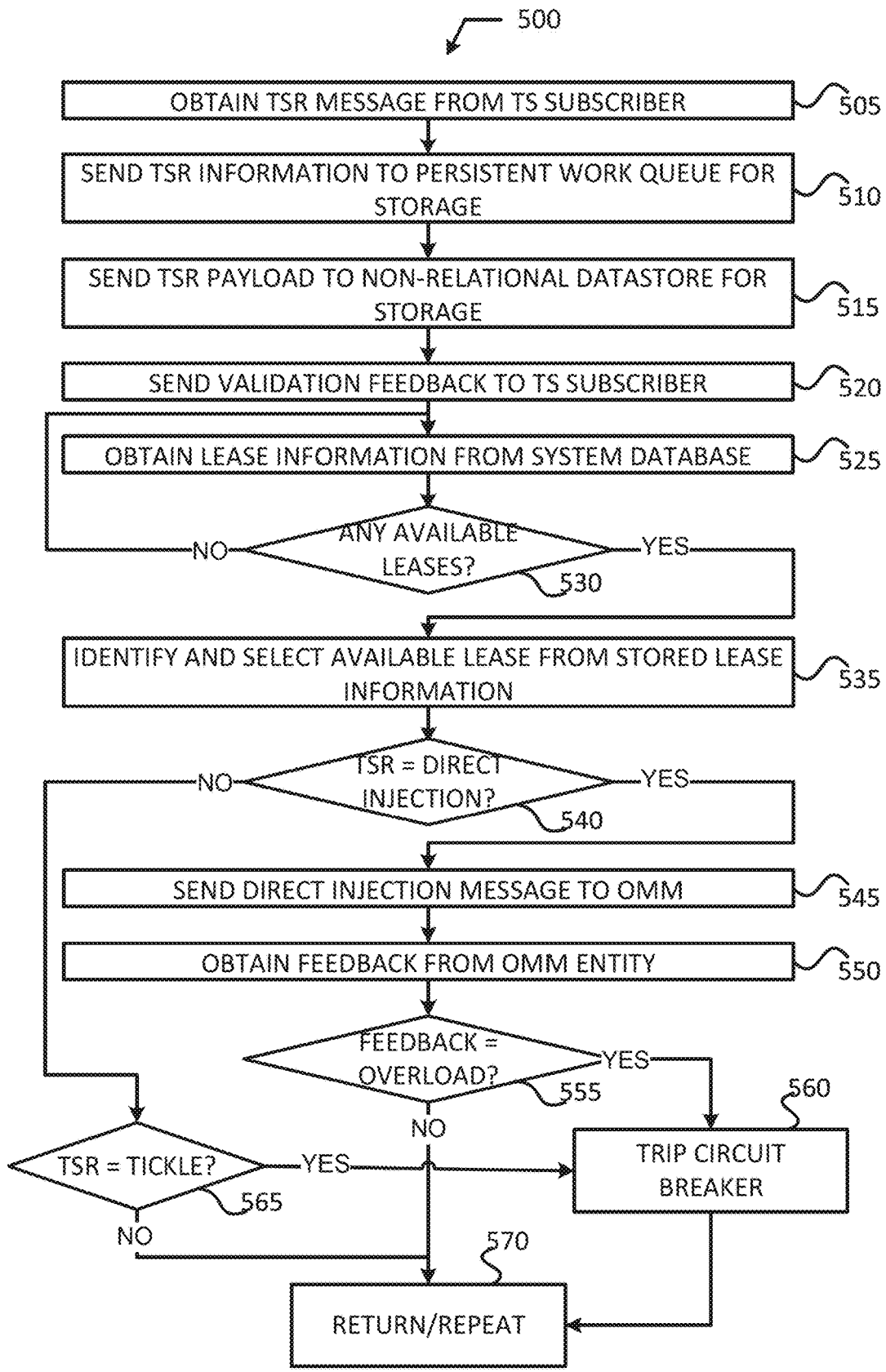
FIG. 5 shows a process for processing triggered send requests by an application server in accordance with various example embodiments.

FIG. 5 illustrates a process 500 for processing triggered send requests by an app server 100 in accordance with various example embodiments. Process 500 may begin at operation 505 where a network interface of the app server 100 may receive a triggered send request (TSR) from a triggered send (TS) subscriber (e.g., TSS 370). At operation 510, a processor system of the app server 100 may identify and extract TSR information from the TSR and control the network interface to send the TSR information to PWQ 320 for storage. At operation 515, the processor system of the app server 100 may identify and extract a TSR payload from the TSR and control the network interface to send the TSR payload to non-relational datastore 360 for storage. In embodiments, the processor system of the app server 100 may perform a validation procedure on the TSR to identify and extract the TSR information and TSR payload. At operation 520, the processor system may generate validation feedback based on the validation procedure, and control the network interface to send the validation feedback to the TS subscriber. The validation feedback may indicate success or failure of the validation procedure, and if a failure occurs, may indicate a reason for the failure.

At operation 525, the app server 100 may obtain lease information from the system DB 24. In some embodiments, operation 525 may be performed on a periodic basis and/or while other operations of process 500 are performed. At operation 530, the processor system may determine whether any available leases exist. If at operation 530 the processor system determines that no available leases exist, then the processor system may loop back to operation 525 obtain new/refreshed lease information from the system DB 24. In other embodiments, the processor system may also fall back to perform the tickle mechanism (e.g., operations 555-570 of FIG. 5). Falling back to the tickle mechanism may occur after looping back to operation 525 a predetermined number of times. If at operation 530 the processor system determines that an available lease exists, then the processor system may proceed to operation 535 to identify and select an available lease from the stored (in-memory) lease information.

At operation 540, the processor system may determine whether the TSR should be directly injected to the OMM entity 300 of the selected lease. In embodiments, this determination may be based on priority information indicated by the TSR information, subscription information associated with the TS subscriber, and/or other like criteria/parameters. If at operation 540 the processor system determines that the TSR should not be sent via direct injection, then the processor system may proceed to operation 565 to determine whether the TSR should be sent via the tickle mechanism. If at operation 540 the processor system determines that the TSR should be sent via direct injection, then the processor system may proceed to operation 545 to send a direct injection message to the OMM entity 300 (or a specific message server) of the selected lease.

At operation 550, the network interface of the app server 100 may obtain feedback information from the OMM entity 300 (message server). At operation 555, the processor system may determine whether the feedback information indicates whether the OMM entity 300 (message server) is experiencing overload conditions. If at operation 555 the processor system determines that the OMM entity 300 (message server) is not experiencing overload conditions (e.g., the direct injection message was indicated as being successfully processed or the like), then the processor system may proceed to operation 570 to return and/or repeat process 500. If at operation 555 the processor system determines that the OMM entity 300 (message server) is experiencing overload conditions (e.g., the direct injection message queue at the OMM entity 300/message server is full or exceeds/meets a preconfigured threshold), then the processor system may proceed to operation 560 to trip a circuit breaker that disables the direct injection mechanism until the queued TSRs are fully processed. In some cases, the circuit breaker trip at operation 560 may be based on a corresponding circuit breaker trip at the OMM entity 300, which may be indicated by the obtained feedback. In some embodiments, the app server 100 may fall back to performing the tickle mechanism while the circuitry breaker has been tripped.

Referring back to operation 540, when the processor system determines that the TSR should not be sent via direct injection, the processor system may determine whether the TSR should be sent via the tickle mechanism operation 565. If at operation 565 the processor system should not be sent via the tickle mechanism (e.g., based on the priority information, subscription information, etc.), then the processor system may proceed to operation 570 to return and/or repeat process 500. If at operation 565 the processor system should be sent via the tickle mechanism (e.g., based on the priority information, subscription information, etc.), the processor system may proceed to operation 560 to control the network interface to send a tickle message to the OMM entity 300 (message server).

Figure 6:
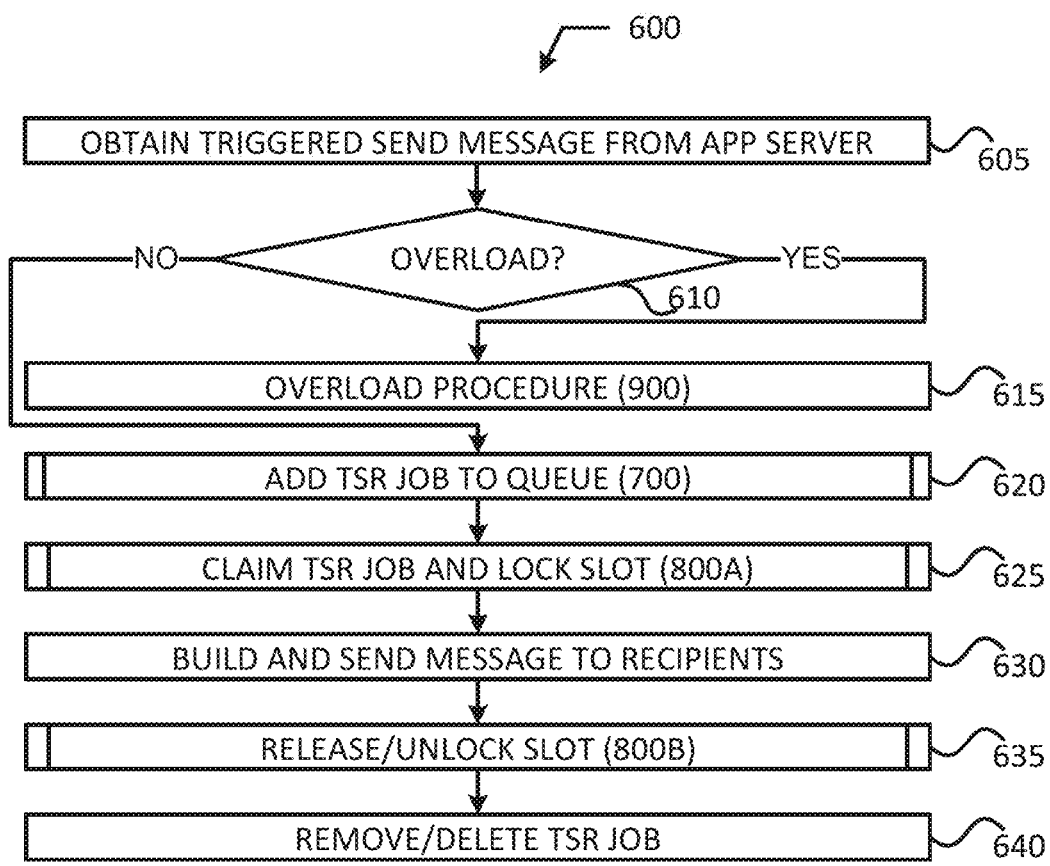
FIG. 6 shows a process for processing a triggered send request by a message server in accordance with various example embodiments.

FIG. 6 illustrates a process 600 for processing a triggered send request by a message server, in accordance with various embodiments. Process 600 may begin at operation 605 where a network interface of the message server may obtain a triggered send message from an app server 100. The triggered send message may be a direct injection message (see e.g., operation 545 of process 500) or a tickle message (see e.g., operation 560 of process 500). At operation 610, a processor system of the message server (or a primary consumer process (e.g., an instance of SPE 306)) may determine whether an overload condition exists. In embodiments, operation 610 may include evaluating whether the size or depth of a TSR job queue (e.g., PST 302) is full, or greater than or equal to a preconfigured threshold. In some embodiments, operation 610 may be based on a resource usage (e.g., processor and/or memory utilization), a number or received requests per unit of time, or some other like criteria or conditions. If at operation 610, if the primary consumer process determines that an overload condition exists, then the processor system may proceed to operation 615 to trigger an overload procedure, which is shown and described with respect to FIG. 9.

Figure 7:
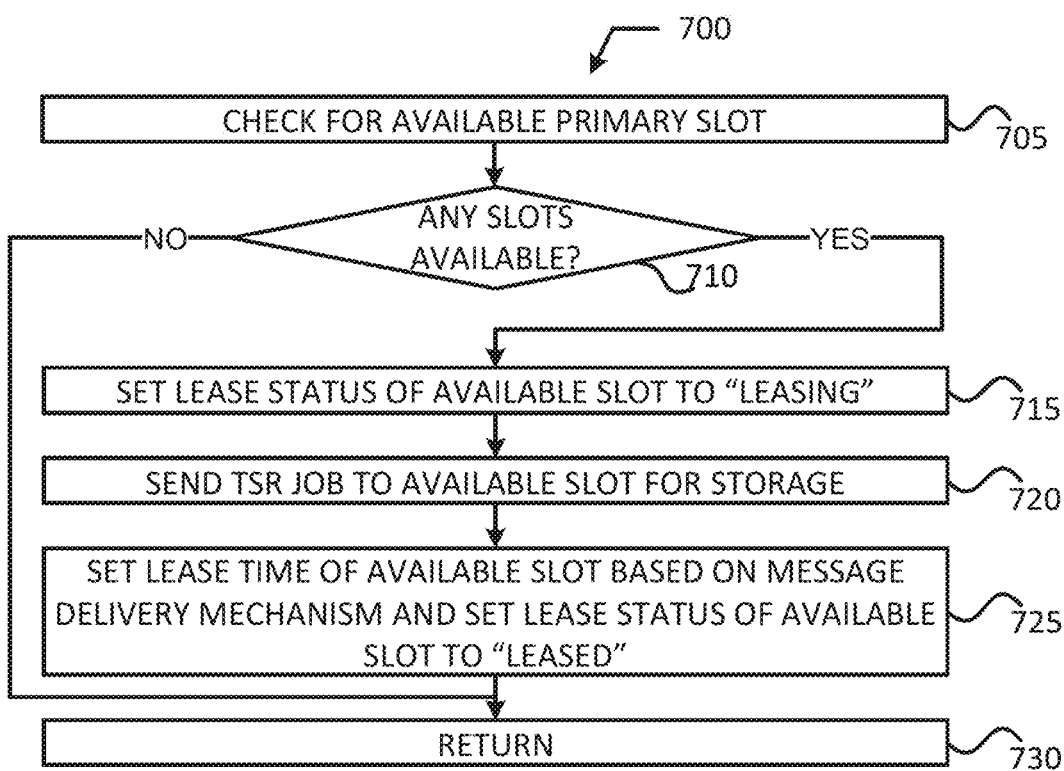
FIG. 7 shows a process for adding a triggered send request job to triggered send request queue in accordance with various embodiments.

If at operation 610, if the processor system determines that an overload condition does not exist, then the processor system may proceed to operation 620 to add the TSR job to the TSR job queue, which is discussed in more detail with regard to FIG. 7. At operation 625, the processor system may initiate a process for claiming the TSR job and locking an associated slot, which is discussed in more detail with regard to FIG. 8. In embodiments, when the TS message is a tickle message, operation 625 may include fetching or otherwise obtaining the TSR payload from the TSS queue.

At operation 630, the processor system may build the message, or cause another device or service to build the message, for one or more intended recipients based on the TSR information and/or a TS definition defined by the TS subscriber. When the TSR is to be sent via the direct injection mechanism, operation 630 may include building the message using the TSR information and TSR payload included with the direct injection message obtained at operation 605. When the TSR is to be sent via the tickle mechanism, operation 630 may include fetching TSR information from a TSS queue associated with the TS subscriber (see e.g., operation 426 of process 400) and fetching the TSR payload from the non-relational datastore 360 (see e.g., operation 438 of process 400). When the TSR is to be sent via the pull mechanism, operation 630 may include polling the PWQ 320 for TSR information and/or TSR payload (see e.g., operation 414 of process 400). In other embodiments, the pull mechanism may include fetching the TSR payload from the non-relational datastore 360 (see e.g., operation 438 of process 400). The processor system may also control the network interface to send the built message to the intended recipients, or otherwise control transmission of the built message (see e.g., operation 442 of process 400).

Figure 8:
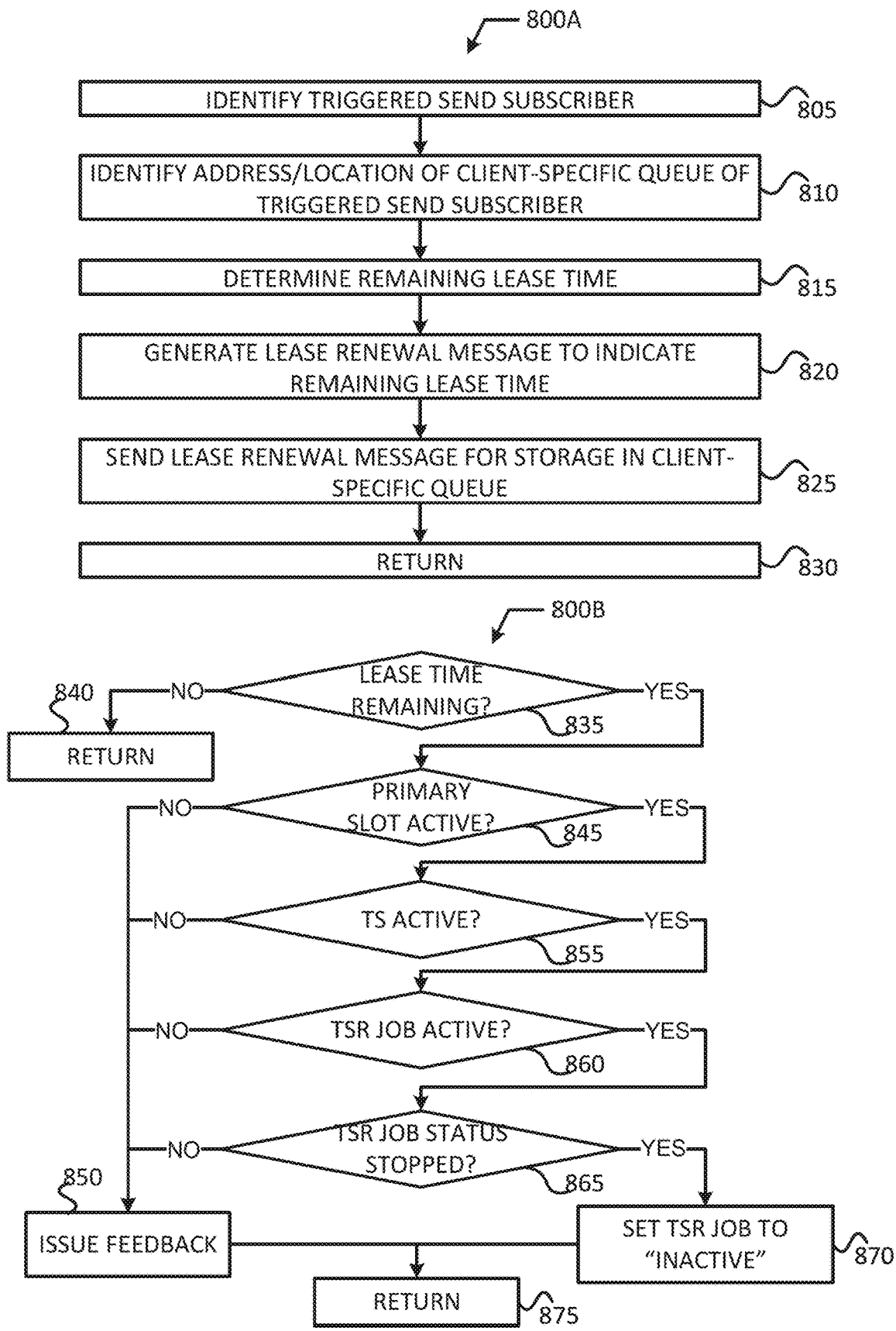
FIG. 8 shows a process for claiming a triggered send request job by a message server and a process for releasing and unlocking a triggered send request job in accordance with various embodiments.

At operation 635, the processor system may initiate a process for releasing the TSR job slot and unlocking the TSR job, which is discussed in more detail with regard to FIG. 8. At operation 640, the processor system may remove and/or delete the TSR job. After performance of operation 640, process 600 may end or repeat as necessary.

FIG. 7 illustrates a process 700 for adding a triggered send request job to triggered send request queue, in accordance with various embodiments. Process 700 may correspond to operation 620 of process 600 (see FIG. 6). Process 700 may begin at operation 705 where the processor system of the message may check for an available slot of the PST 302. At operation 710, the processor system may determine if there are any available slots. If at operation 710 the processor system determines that there are no available slots, then the processor system may proceed to operation 730 to return to process 600. If at operation 710 the processor system determines that there is an available slot, then the processor system may proceed to operation 715 to set a lease status of the available slot to "leasing". At operation 720, the processor system may control the network interface to send the TSR job (or a job ID) to the available slot for storage. At operation 725, the processor system may set the lease time of the available slot according to the message delivery mechanism of the TSR job (e.g., email, push notification, SMS/MMS, OTT, etc.) and set the lease status to "leased". At operation 730, the processor system may return to process 600.

FIG. 8 illustrates a process 800A for claiming a triggered send request job by a message server and a process 800B for releasing and unlocking a triggered send request job, in accordance with various embodiments. Process 800A may correspond to operation 625 of process 600 (see FIG. 6), and process 800B may correspond to operation 635 of process 600 (see FIG. 6).

Process 800A may begin at operation 805 where the processor system of the message server may identify a TS subscriber that sent the TSR, which may be based on a client/tenant/org ID included in the TSR information. At operation 810, the processor system may identify an address or location of a client-specific queue of the TS subscriber (which may be located in tenant DB 22). At operation 815, the processor system may determine a remaining amount of time of the lease time. At operation 820, the processor system may generate a lease renewal message to indicate the remaining lease time. At operation 825, the processor system may control the network interface of the message server to send the lease renewal message to the tenant DB to store the lease renewal message in the TSS queue. At operation 830, the processor system may return to process 600.

Process 800B may begin at operation 835 where the processor system of the message server may determine whether there is any remaining lease time (e.g., whether the lease time/lease period has expired), and if no lease time is remaining, the processor system may proceed to operation 840 to return to process 600. If at operation 835 the processor system determines that there is lease time remaining, then the processor system may proceed to operation 845 to determine whether the primary slot storing the TSR job is still active.

If at operation 845 the processor system determines that the primary slot processing the TSR job is not active, the processor system may proceed to operation 850 to control the network interface to send a feedback message to the app server 100, which may include a status code and/or message to indicate that an error has occurred. For example, the status (error) code may be HTTP status code 502 to indicate "Bad Gateway", HTTP status code 500 to indicate "Internal Server Error", or the like. The returned error code may be used to inform the calling client (e.g., app server 100) that the OMM entity 300 (message server) it has invoked for the tickle or direct injection cannot process the request. The calling client (app server 100) can then refresh its cache/memory system to see if another OMM entity 300 has taken up the lease or if a new lease needs to be issued (e.g., whether a new consumer process has or should be started). If at operation 845 the processor system determines that the primary slot storing the TSR job is still active, the processor system may proceed to operation 855 to determine if TSR processing is active.

If at operation 855 the processor system determines that TSR processing is not active, the processor system may proceed to operation 850 to control the network interface to send a feedback message to the app server 100, which may include a status code to indicate that TSR feedback has been paused or stopped. For example, the feedback message may include an HTTP status code 200 to indicate "Success", or the like, and may include a customized message (body/payload) to indicate that TSR processing is inactive. In this case, TSR processing may have been paused by the TSS 370, and in some cases, the TSS 370 may have set the TSR status to an inactive state/status indicating that processing of TSRs should stop. The TSS 370 may take such an action if the TSS 370 wishes to manage or review the queued TSRs before allowing built messages to be sent. When the TSRs are in this state, the TSS 370 may also delete the queued requests if the TSS 370 does not want the TSRs to be sent. The status returned to the client (app server 100) may indicate that the app server should not continue to tickle or perform direct injections for this particular TSS 370 since the TSR processing has been paused. In this state, the TSRs may be saved/stored in the TSS queue to until the TSS 370 decides to either purge the queued TSRs or leave them active. When the TSS 370 resumes the triggered sends, these stored TSRs may be processed from the TSS queue and the tickle or direct injection may be resumed. If at operation 855 the processor system determines that the TSR job is still active, the processor system may proceed to operation 860 to determine whether the TSR job status is active.

If at operation 860 the processor system determines that the TSR job is not active, the processor system may proceed to operation 850 to control the network interface to send a feedback message to the app server 100, which may include a status code and/or message to indicate that an error has occurred. For example, the status (error) code may be HTTP status code 500 to indicate "Internal Server Error", or the like. In this case, the TSR job may have, or transition to an inactive status when new content for a triggered send has been published. Since the send level content is tied to the TSR job, publishing a new send level content results in a new job for the triggered send. The send level content may be a snap shot of the content defined by a TSR definition that is taken when the TSR job is created. The feedback message returned may inform the client (app server 100) that the lease for the TSR job is being terminated because the TSR job is inactive or expired, and that the app server 100 should query for a new lease in order to send a triggered send with the new content. If at operation 860 the processor system determines that the TSR job is still active, the processor system may proceed to operation 865 to determine if the TSR job status has stopped or terminated.

If at operation 865 the processor system determines that the TSR job status has been stopped or terminated, the processor system may proceed to operation 870 to and set a status of the TSR job to "inactive", which may cause the app server 100 to stop accepting work if the TSS 370 has configured the triggered sends to be stopped or paused. In some embodiments, the TSR job may be put into the inactive state if the TSS 370 wishes to reject their API requests for the triggered send, which may allow the OMM entity 300 and/or the app server 100 to take an alternate action if the OMM entity 300 cannot process the TSR due to an error condition. Each of the triggered sends may also have multiple TSR jobs representing configuration snap shots for corresponding/associated triggered sends, where only one such TSR job is current (or has an active status) representing a currently active configuration snapshot for a triggered send. If system 16 (rather than the TSS 370) puts the current TSR job (active snapshot) into an inactive/error state because some issue such as invalid message script submitted through via the API (app server 100) then the TSS 370 may configure the triggered send so that the app servers 100 will stop accepting TSRs. This may allow the TSS 370 platform/system to take corrective or alternate actions. Additionally, in some embodiments, feedback may be issued after the TSR job is placed in the inactive state at operation 870. The feedback message may include, with or without a customized message, an HTTP status code 204 to indicate "No Content", which is a success code for a DELETE request, HTTP status code 203 to indicate "Non-Authoritative Information; and/or the like.

If at operation 865 the processor system determines that the TSR job status has not been stopped or terminated, the processor system may proceed to operation 850 to control the network interface to send a feedback message to the client (app server 100), which may include a status code and/or message to indicate a positive outcome in that a tickle or direct injection may occur. For example, the feedback message may include an HTTP status code 200 to indicate "Success". In another example, the feedback message may include a same or similar HTTP status code as mentioned previously with regard to operation 860, and the processor system may perform the same or similar operations/functions as mentioned previously with regard to operation 860.

At operation 875, the processor system may return to process 600. Although example error/status codes have been discussed previously, other status codes, error messages, and/or other message types may be used in other embodiments. Furthermore, in various embodiments, the lease status for the TSR might be set to "inactive" or otherwise updated prior to sending the feedback at operations 845, 855, 860, and/or 865.

Figure 9:
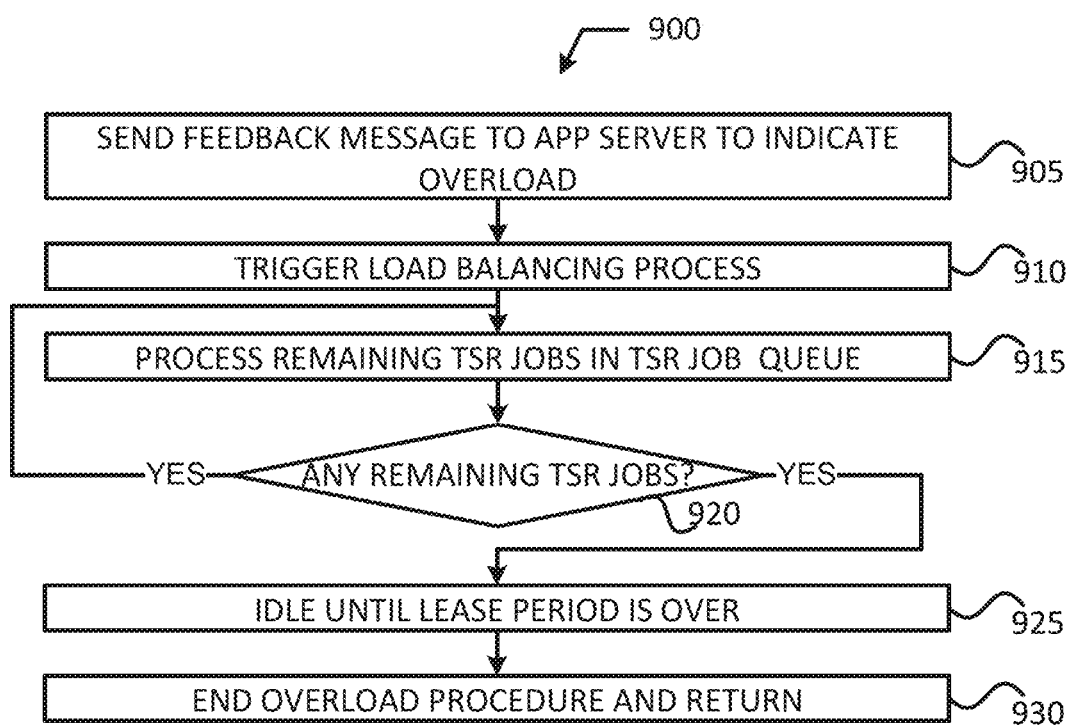
FIG. 9 shows an overload process in accordance with various embodiments.

FIG. 9 illustrates an overload process 900, in accordance with various example embodiments. Process 900 may correspond to operation 615 of process 600 (see FIG. 6). Process 900 may begin at operation 905 where the processor system of the message server may send a feedback message to the app server 100 to indicate that the message server is experiencing an overload scenario. For example, the feedback message could include HTTP status code 500 or the like. This message may be referred to as a "queue overflow message". The queue overflow message may trigger the app server 100 to fall back to the tickle behavior.

At operation 910, the processor system may trigger a load balancing process. In one example, a consumer process implemented by the processor system of the message server (e.g., an instance of the SPE 306 of FIG. 3) may evaluate the in-memory TSR job queue (e.g., PST 302) depth and launch additional secondary consumer processes (e.g., other instances of the SPE 306 implemented by the message server or other message servers) across the OMM entities 300 (e.g., message server farm) to handle the spike in TSRs.

At operations 915 and 920, the processor system may implement the primary consumer process (e.g., the instance of SPE 306) to process the remaining jobs in the in-memory TSR job queue until the in-memory queue is emptied. The processor system may implement the primary consumer processor to fall back to consuming from PWG 320 and/or the TSS queue in the TS subscriber tenant space until all work is exhausted. At operation 925, the processor system may idle until the lease period is over. In embodiments, once all of the TSRs are processed, the secondary consumer processes may shut down, and the primary consumer process may idle for the configured lease period until the lease is extended by the arrival of more TSRs or until the lease period eventually expires.

At operation 930, the processor system may end the overload procedure and return to process 600. In embodiments, when the lease period expires, the primary consumer process on the Message server will terminate and the circuit breaker will be reset The specific details of the specific aspects of implementations disclosed herein may be combined in any suitable manner without departing from the spirit and scope of the disclosed implementations. However, other implementations may be directed to specific implementations relating to each individual aspect, or specific combinations of these individual aspects. Additionally, while the disclosed examples are often described herein with reference to an implementation in which an on-demand database service environment is implemented in a system having an application server providing a front end for an on-demand database service capable of supporting multiple tenants, the present implementations are not limited to multi-tenant databases or deployment on application servers. Implementations may be practiced using other database architectures, i.e., ORACLE®, DB2® by IBM and the like without departing from the scope of the implementations claimed.

It should also be understood that some of the disclosed implementations can be embodied in the form of various types of hardware, software, firmware, or combinations thereof, including in the form of control logic, and using such hardware or software in a modular or integrated manner. Other ways or methods are possible using hardware and a combination of hardware and software. Additionally, any of the software components or functions described in this application can be implemented as software code to be executed by one or more processors using any suitable computer language such as, for example, Java, C++ or Perl using, for example, existing or object-oriented techniques. The software code can be stored as a computer- or processor-executable instructions or commands on a physical non-transitory computer-readable medium. Examples of suitable media include random access memory (RAM), read only memory (ROM), magnetic media such as a hard-drive or a floppy disk, or an optical medium such as a compact disk (CD) or DVD (digital versatile disk), flash memory, and the like, or any combination of such storage or transmission devices.

Computer-readable media encoded with the software/program code may be packaged with a compatible device or provided separately from other devices (for example, via Internet download). Any such computer-readable medium may reside on or within a single computing device or an entire computer system, and may be among other computer-readable media within a system or network. A computer system, or other computing device, may include a monitor, printer, or other suitable display for providing any of the results mentioned herein to a user.

While some implementations have been described herein, it should be understood that they have been presented by way of example only, and not limitation. Thus, the breadth and scope of the present application should not be limited by any of the implementations described herein, but should be defined only in accordance with the following and later-submitted claims and their equivalents.

The invention claimed is:

1. One or more non-transitory computer-readable media (NTCRM) comprising instructions, wherein execution of the instructions by one or more processors is operable to cause an application server to:
   obtain a triggered send request (TSR) message from a triggered send subscriber, the TSR message comprising TSR information and a TSR payload to be used by a message server to build and send a user message to a user of a triggered send subscriber (TSS) platform;
   send the TSR information and the TSR payload directly to an available message server of a plurality of message servers for message processing when the TSR information indicates that a high priority is associated with the TSR payload;
   notify the available message server that the TSR payload is available for message processing when the TSR information indicates that a medium priority is associated with the TSR payload;
   store the TSR information to a persistent work queue (PWQ) when the TSR information indicates that the medium priority is associated with the TSR payload or indicates that a low priority is associated with the TSR payload, the PWQ being separate from the plurality of message servers and the application server; and
   store the TSR payload to a non-relational datastore regardless of the priority associated with the TSR payload, the non-relational datastore being separate from the plurality of message servers and the application server.

2. The one or more NTCRM of claim 1, wherein execution of the instructions is operable to cause the application server to:
   load, into a memory system of the application server, lease information from a lease database, the lease information indicating lease periods during which specified resources of individual message servers of the plurality of message servers will be available for processing TSR payloads.

3. The one or more NTCRM of claim 2, wherein, to send the TSR information and the TSR payload directly to the available message server, execution of the instructions is operable to cause the application server to:
   select the available message server from among the plurality of message servers associated with an unreserved lease period indicated by the lease information;
   establish a direct network connection between the application server and the available message server at a beginning of the unreserved lease period; and
   transmit the TSR payload to the available message server during the lease period.

4. The one or more NTCRM of claim 2, wherein the memory system is to store a mapping of user identifiers to TSS-specific queues, and execution of the instructions is operable to cause the application server to:
   identify, using the mapping, a TSS-specific queue of user-specific queues associated with a sender of the message; and
   store the TSR payload to the TSS-specific queue within a message processing database when the TSR information indicates the medium priority is associated with the TSR payload.

5. The one or more NTCRM of claim 4, wherein, to notify the available message server that the TSR payload is available for message processing, execution of the instructions is operable to cause the application server to:
   select the available message server from among the plurality of message servers associated with an unreserved lease period indicated by the lease information; and
   transmit a wakeup message to the selected message server during the lease period, the wakeup message to indicate that the TSS-specific queue has reached a predetermined threshold, the wakeup message is to cause the selected message server to transition from an idle state to an active state, and the wakeup message is to cause the selected message server in the active state to access messages stored in the TSS-specific queue for message processing in response to receipt of the second message.

6. The one or more NTCRM of claim 3, wherein the direct network connection is established using a WebSocket protocol implementation for WebSocket communication sessions between two servers.

7. The one or more NTCRM of claim 2, wherein the memory system is to store a mapping of an identifier of the application server to an identifier of each message server of the plurality of message servers.

8. The one or more NTCRM of claim 7, wherein the identifier of each message server is a socket address for a message processing process operated by each message server, and a socket address associated with the selected message server is to be used for a direct network connection between the application server and a message processing process operated by the selected message server, and the direct network connection is to be used send the TSR information and the TSR payload directly to the available message server.

9. The one or more NTCRM of claim 7, wherein the identifier of each message server is a fully qualified domain name (FQDN) or an Internet Protocol (IP) address for each message server, an FQDN or an IP address associated with the selected message server is to be used for a direct network connection between the application server and the selected message server, and send the TSR information and the TSR payload directly to the available message server.

10. The one or more NTCRM of claim 1, wherein, to store the TSR payload to the non-relational datastore, execution of the instructions is operable to cause the application server to:
store the TSR payload with a time-to-live (TTL) parameter in the non-relational datastore, the TTL parameter indicating a time period for storage of the TSR payload in the non-relational datastore, and the TSR payload being accessible in the non-relational datastore via a web server.

11. A method of operating an application server, the method comprising:
obtaining, by the application server, a triggered send request (TSR) message from a triggered send subscriber (TSS), the TSR message including TSR information and a TSR payload;
initiating, by the application server, a first push processing mechanism with a pool of Outgoing Message Manager (OMM) servers when the TSR is determined to be a high priority TSR, the first push processing mechanism includes directly sending a direct injection message to an available OMM server in the pool of OMM servers over a direct one-to-one communication session between the application server and the selected OMM server, the direct injection message including the TSR information and the TSR payload;
initiating, by the application server, a second push processing mechanism with the OMM servers when the TSR is determined to be a medium priority TSR, the second push processing mechanism includes directly sending a wakeup message to the available OMM server over the direct one-to-one communication session, the wakeup message only including the TSR information and indicates that the TSR payload is available for message processing;
initiating, by the application server, a pull processing mechanism with the OMM servers when the TSR is determined to be a low priority TSR, the pull processing mechanism including storing, by the application server, the TSR information in a persistent work queue (PWQ) separate from the application server and the pool of OMM servers, the TSR information in the PWQ being for consumption by the available OMM server in the pool of OMM servers; and
storing, by the application server, the TSR payload to a non-relational datastore regardless of the priority associated with the TSR payload, the non-relational datastore being separate from the pool of OMM servers and the application server.

12. The method of claim 11, further comprising:
loading, by the application server into a memory system of the application server, lease information from a lease database, the lease information indicating lease periods when individual OMM servers of the pool of OMM servers will be available for building messages by processing TSR payloads.

13. The method of claim 12, wherein the first and second push processing mechanisms comprise:
identifying, by the application server, a TSS queue based on a mapping of user identifiers to TSS queues stored in the memory system of the application server; and
storing, by the application server, the TSR information and the TSR payload in the identified TSS queue when the lease information indicates no available lease periods.

14. The method of claim 13, wherein the first push processing mechanism comprises:

selecting, by the application server, the available OMM server from the pool of OMM servers when the available OMM server has an unreserved lease period as indicated by the lease information;
establishing, by the application server, the direct one-to-one communication session with the available OMM server at a beginning of the unreserved lease period; and
transmitting, by the application server, the direct injection message to the available OMM server during the lease period.

15. The method of claim 13, wherein the second push processing mechanism comprises:
selecting, by the application server, the available OMM server associated with an unreserved lease period indicated by the lease information;
establishing, by the application server, the direct one-to-one communication session with the available OMM server at a beginning of the unreserved lease period; and
transmitting, by the application server, the wakeup message to the selected OMM server during the lease period, the wakeup message to cause the selected OMM server to transition from an idle state to an active state, and the wakeup message is to cause the selected OMM server in the active state to access the TSR payload stored in the TSS queue for message processing.

16. An application server, comprising:
network interface circuitry to obtain a triggered send request (TSR) message from a triggered send subscriber (TSS), the TSR message including TSR information and a TSR payload; and
processor circuitry communicatively coupled with the network interface circuitry, the processor circuitry is operable to:
initiate first push processing with a pool of Outgoing Message Manager (OMM) servers when the TSR is determined to be a high priority TSR, the first push processing includes directly sending a direct injection message to an available OMM server in the pool of OMM servers over a direct one-to-one communication session between the application server and the selected OMM server, the direct injection message including the TSR information and the TSR payload;
initiate second push processing with the OMM servers when the TSR is determined to be a medium priority TSR, the second push processing includes directly sending a wakeup message to the available OMM server over the direct one-to-one communication session, the wakeup message only including the TSR information and indicates that the TSR payload is available for message processing;
initiate pull processing with the OMM servers when the TSR is determined to be a low priority TSR, the pull processing includes storing, by the application server, the TSR information in a persistent work queue (PWQ) separate from the application server and the pool of OMM servers, the TSR information in the PWQ being for consumption by the available OMM server in the pool of OMM servers; and
store the TSR payload to a non-relational datastore regardless of the priority associated with the TSR payload, the non-relational datastore being separate from the pool of OMM servers and the application server.

17. The application server of claim 16, further comprising:
 memory circuitry coupled with the processor circuitry, and the processor circuitry is further operable to:
 load lease information into the memory circuitry from a lease database remote from the application server, the lease information indicating lease periods when individual OMM servers of the pool of OMM servers will be available for building messages by processing TSR payloads.

18. The application server of claim 17, wherein, to perform the first and second push processing, the processor circuitry is operable to:
 identify a TSS queue based on a mapping of user identifiers to TSS queues stored in the memory circuitry of the application server; and
 store the TSR information and the TSR payload in the identified TSS queue when the lease information indicates no available lease periods.

19. The application server of claim 18, wherein, to perform the first and second push processing, the processor circuitry is operable to:
 select the available OMM server from the pool of OMM servers when the available OMM server has an unreserved lease period as indicated by the lease information;
 establish the direct one-to-one communication session with the available OMM server via the network interface circuitry at a beginning of the unreserved lease period; and
 control the network interface circuitry to transmit the direct injection message to the available OMM server during the lease period.

20. The application server of claim 18, wherein, to perform the first and second push processing, the processor circuitry is operable to:
 select the available OMM server associated with an unreserved lease period indicated by the lease information;
 establish the direct one-to-one communication session with the available OMM server via the network interface circuitry at a beginning of the unreserved lease period; and
 control the network interface circuitry to transmit the wakeup message to the selected OMM server during the lease period, the wakeup message to cause the selected OMM server to transition from an idle state to an active state, and the wakeup message is to cause the selected OMM server in the active state to access the TSR payload stored in the TSS queue for message processing.

* * * * *